(12) United States Patent
Atiqullah et al.

(10) Patent No.: US 9,834,630 B2
(45) Date of Patent: Dec. 5, 2017

(54) SUPPORTED METALLOCENE CATALYST FOR OLEFIN POLYMERIZATION

(71) Applicant: KING FAHD UNIVERSITY OF PETROLEUM AND MINERALS, Dhahran (SA)

(72) Inventors: Muhammad Atiqullah, Dhahran (SA); Mamdouh A. Al-Harthi, Dhahran (SA); Siripon Anantawaraskul, Bangkok (TH); Abdul-Hamid M. Emwas, Thuwal (SA); Anwar Ul-Hamid, Dhahran (SA); Anwar Hossaen, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 14/735,103

(22) Filed: Jun. 9, 2015

(65) Prior Publication Data

US 2015/0353659 A1 Dec. 10, 2015

Related U.S. Application Data

(60) Provisional application No. 62/009,875, filed on Jun. 9, 2014.

(51) Int. Cl.
C08F 210/16 (2006.01)
C08F 4/659 (2006.01)
C08F 4/6592 (2006.01)

(52) U.S. Cl.
CPC ........ *C08F 210/16* (2013.01); *C08F 4/65912* (2013.01); *C08F 4/65925* (2013.01)

(58) Field of Classification Search
CPC ................ B01J 2531/48; C08F 210/16; C08F 4/65916; Y10S 526/943; C08L 23/04
See application file for complete search history.

(56) References Cited

U.S. PATENT DOCUMENTS 5,561,091 A * 10/1996 Mink ................. C08F 210/16 502/115
5,614,456 A * 3/1997 Mink ................. B01J 31/128 502/104

(Continued)

OTHER PUBLICATIONS

Yoon. Macromolecular Research, vol. 12, No. 4, pp. 336-441 (2004).*

(Continued)

*Primary Examiner* — Michael A Salvitti
(74) *Attorney, Agent, or Firm* — Oblon, McClelland, Maier & Neustadt, L.L.P.

(57) ABSTRACT

The supported metallocene catalyst for olefin polymerization is ("BuCp)$_2$ZrCl$_2$ impregnated onto a silica support having MAO tethered thereon. The catalyst is made by dehydroxylating silica, adding MAO dropwise to a slurry of the silica in toluene, heating the mixture for several hours, reacting ("BuCp)$_2$ZrCl$_2$ in toluene solvent with the MAO/silica support, and drying the catalyst under vacuum. The catalyst may be used, e.g., to catalyze copolymerization of ethylene with 1-hexene.

16 Claims, 17 Drawing Sheets

(56) References Cited

U.S. PATENT DOCUMENTS

| | | | | |
|---|---|---|---|---|
| 5,691,264 | A * | 11/1997 | Sacchetti | C08F 10/00 502/113 |
| 6,908,876 | B2 * | 6/2005 | Atiqullah | C08F 10/00 502/113 |
| 2004/0209766 | A1 * | 10/2004 | Atiqullah | C08F 10/00 502/131 |
| 2007/0073013 | A1 * | 3/2007 | Razavi | C08F 10/00 526/126 |
| 2013/0289227 | A1 * | 10/2013 | Jensen | B01J 31/00 526/114 |
| 2015/0353658 | A1 * | 12/2015 | Atiqullah | C08F 210/16 524/855 |
| 2015/0353659 | A1 * | 12/2015 | Atiqullah | C08F 210/16 524/855 |

OTHER PUBLICATIONS

Ko et al. Journal of Nanoscience and Nanotechnology vol. 10, 180-185, 2010.*
Bahuleyan et al. Journal of Polymer Science: Part A: Polymer Chemistry, vol. 46, 1066-1082 (2008).*
M. Atiqullah et al., "Effects of Supported ("BuCp)$_2$ZrCl$_2$ Catalyst Active-Center Distribution on Ethylene-1-Hexene Copolymer Backbone Heterogeneity and Thermal Behaviors", Ind. Eng. Chem. Res. (Jun. 12, 2013), vol. 52, pp. 9359-9373.
M. Atiqullah et al., "Silica-supported ("BuCp)$_2$ZrCl$_2$: effect of catalyst active center distribution on ethylene-1-hexene copolymerization", Polym. Int. (Jul. 22, 2013), 18 pages.

* cited by examiner

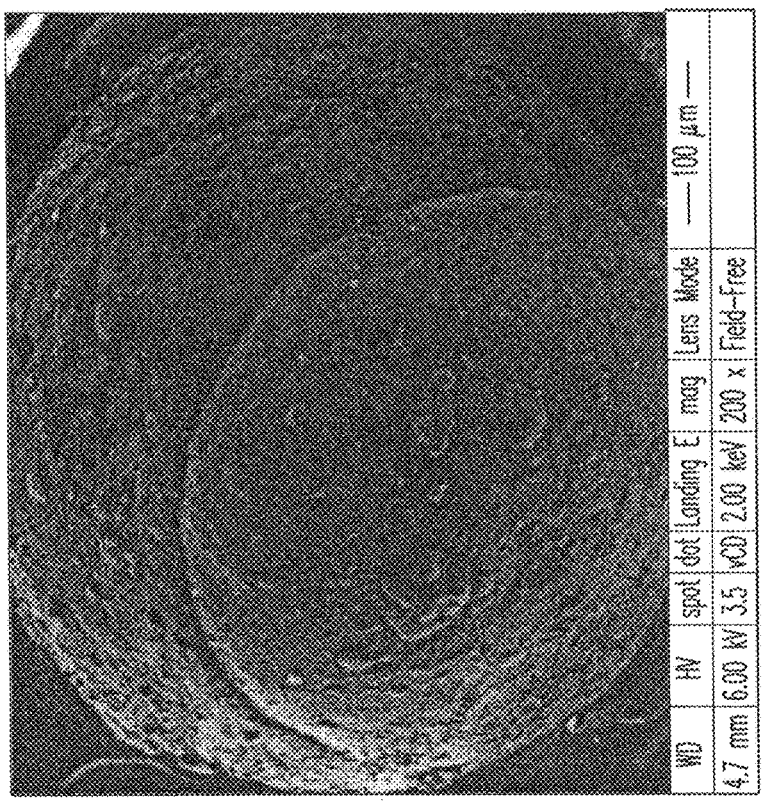
Fig. 2D Copolymer 2
Fig. 2C Catalyst 2

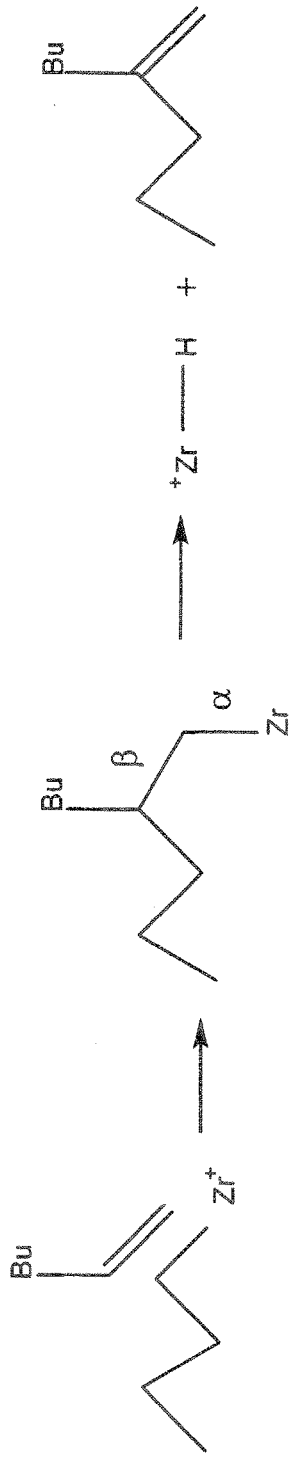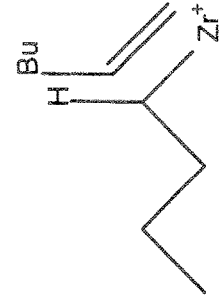
Fig. 19A
Fig. 19B

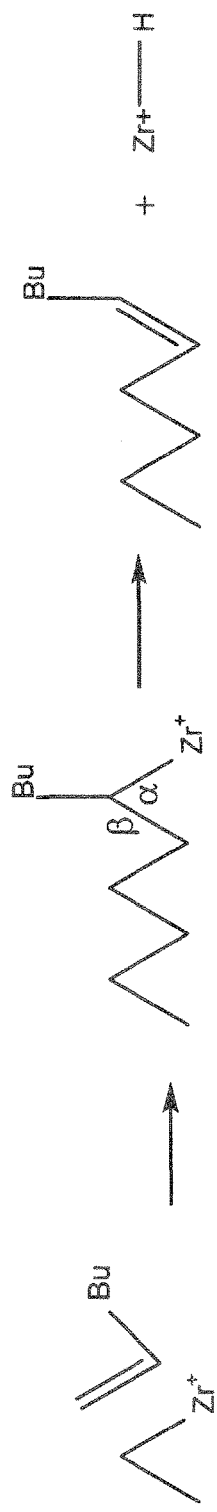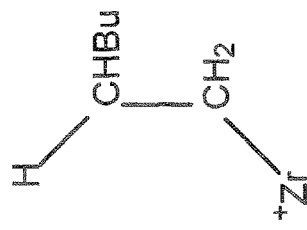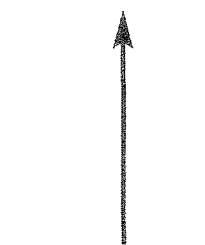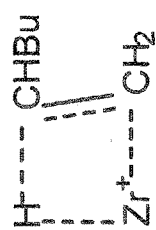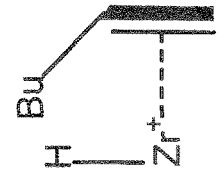
Fig. 19C
Fig. 20

SUPPORTED METALLOCENE CATALYST FOR OLEFIN POLYMERIZATION

CROSS-REFERENCE TO RELATED APPLICATIONS

This application claims priority to U.S. Provisional Patent Application Ser. No. 62/009,875, filed Jun. 9, 2014.

BACKGROUND OF THE INVENTION

1. Field of the Invention

The present invention relates to a highly active supported metallocene catalyst system, and particularly to a supported catalyst for olefin polymerization and the copolymerization of ethylene-1-hexene using a silica-supported methylaluminoxane/ziroconocene catalyst.

2. Description of the Related Art

A copolymer of ethylene with an α-olefin, including 1-hexene, is called a linear low-density polyethylene (LLDPE). The incorporation of α-olefin into the polymer backbone introduces side chain branching and structural defects. LDPE has density, crystallinity, melting behavior, processing characteristics, and thermal, rheological and mechanical properties that significantly differ from those of low-density polyethylene (LDPE) and high-density polyethylene (HDPE). Consequently, LLDPE has a series of applications superior to those of LDPE and HDPE.

LLDPE joined the polyethylene family after LDPE and HDPE. It can be synthesized using the multi-site conventional Ziegler-Natty (Z-IN) catalysts, as well as the so-called single-site metallocene catalysts. Unlike Z-N catalysts, metallocene catalysts have marked structural variations, which are effected through bridge modifications and substitutions in the cyclopentadienyl ligand and its analogues. Particularly in solution polymerization, they show much higher activity than Z-N catalysts. They produce ethylene homo- and copolymers having narrow molecular weight distribution (MWD) (polydispersity index 2) and uniform copolymer composition distribution (CCD) in solution polymerization, usually at high co-catalyst to catalyst ratios. Also, metallocenes, because of their ability to undergo remarkable structural variations, can regulate co-monomer-introduced branch distribution, intra-chain microstructures, and structural/enchainment defects of ethylene α-olefin (LLDPEs) in a highly versatile fashion.

Much research continues worldwide into metallocene-catalyzed olefin polymerization to make the production of polyolefins a dynamic technology-driven industry. However, several challenges have to be overcome to develop industrial-grade supported/heterogenized metallocene catalysts. These include the following: (i) maintain the single-site characteristics of metallocenes upon heterogenization; (ii) overcome the significant drop in catalyst activity; (iii) prevent catalyst leaching (which causes severe reactor fouling, and damages polymer particle morphology); and (iv) eliminate the separate feeding of the methylaluminoxane (MAO) co-catalyst (which gels and degrades during storage, and which is very costly).

Metallocenes can be generally supported using several immobilization procedures. It turns out that silica/methylaluminoxane (MAO) co-catalyst/zirconocene, in general, offers higher catalyst activity than the remaining routes. However, MAO forms gels and degrades during co-catalyst feeding. It would be desirable to provide an improved method of producing ethylene copolymers using silica and methylaluminoxane (MAO) supported metallocene catalyst that permits active center distribution and higher copolymerization activity.

Thus, a supported catalyst for olefin polymerization solving the aforementioned problems is desired.

SUMMARY OF THE INVENTION

The supported metallocene catalyst for olefin polymerization is ("BuCp)$_2$ZrCl$_2$ impregnated onto a silica support having MAO tethered thereon. The catalyst is made by dehydroxylating silica, adding MAO dropwise to a slurry of the silica in toluene, heating the mixture for several hours, reacting ("BuCp)$_2$ZrCl$_2$ in toluene solvent with the MAO/silica support, and drying the catalyst under vacuum. The catalyst may be used, e.g., to catalyze copolymerization of ethylene with 1-hexene.

In particular, the process of polymerization of olefins comprises contacting, in a reactor: (a) ethylene and at least one comonomer selected from the group consisting of $C_4$ to $C_8$ alpha-olefins with (b) a supported catalyst system comprising a metallocene catalyst compound activated by methylaluminoxane, and a silica support material; wherein the process produces a polyethylene copolymer having a bulk density of at least 0.27 gram/cubic centimeter, and the support material is silica, the metallocene catalyst compound is a butyl-substituted bis-cyclopentadienyl zirconocene catalyst, and the supported catalyst system is slurried in an organic solvent. Additionally, a method of preparing a supported catalyst useful for polymerizing olefins is disclosed, which comprises (a) providing silica and an organic solvent slurry under an inert atmosphere; (b) adding excess alkylaluminoxane under inert atmosphere drop-wise to the slurry while heating and stirring to produce an activated mixture; (c) reacting the activated mixture with a metallocene catalyst for a period of time; and (d) drying the slurry to yield the supported catalyst in free-flowing powder form.

These and other features of the present invention will become readily apparent upon further review of the following specification and drawings.

BRIEF DESCRIPTION OF THE DRAWINGS

FIGS. 2C and 2D show SEM images of catalyst 2 and copolymer 2 particles prepared using catalyst 2.

FIG. 19A is a reaction scheme showing use of the catalyst of FIG. 15 for copolymerization of ethylene and 1-hexene, including a chain transfer mechanism for 1-hexene producing a vinylidene terminus.

FIG. 19B is a reaction scheme showing use of the catalyst of FIG. 15 for copolymerization of ethylene and 1-hexene, including a chain transfer mechanism for 1-hexene producing a vinyl terminus.

FIG. 19C is a reaction scheme showing use of the catalyst of FIG. 15 for copolymerization of ethylene and 1-hexene, including a chain transfer mechanism for 1-hexene producing a trans-vinyl terminus.

FIG. 20 is a reaction scheme showing a mechanism for activation of dormant zirconium-hydrogen active catalyst sites through insertion of 1-hexene.

Similar reference characters denote corresponding features consistently throughout the attached drawings.

DETAILED DESCRIPTION OF THE PREFERRED EMBODIMENTS

Figure 1A:
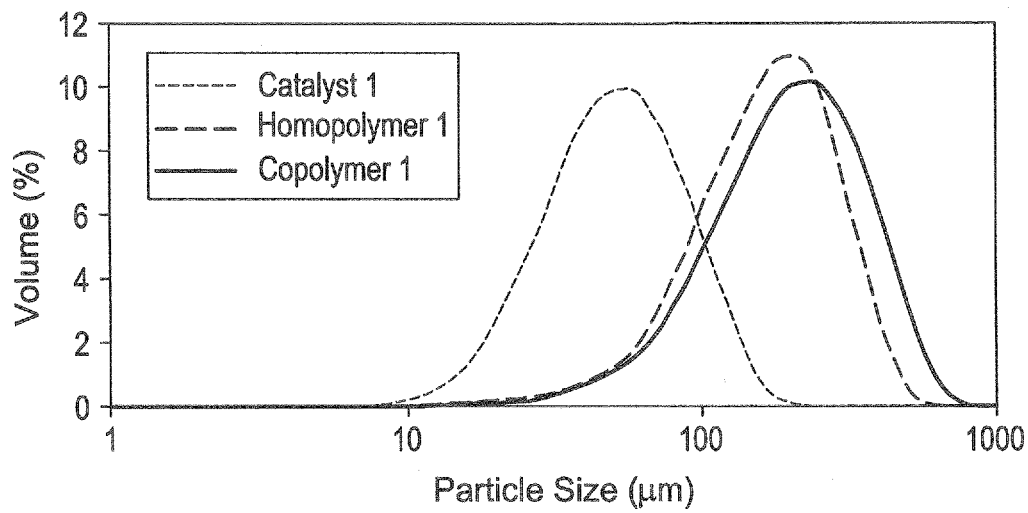
FIG. 1A is a graph showing a comparison of the particle size distribution of catalyst 1 (silica/MAO/"BuCp)$_2$ZrCl$_2$) with that of the corresponding ethylene homopolymer and copolymer 1.

The supported metallocene catalyst for olefin polymerization is ("BuCp)$_2$ZrCl$_2$ impregnated onto a silica support having MAO tethered thereon. The catalyst is made by dehydroxylating silica, adding MAO dropwise to a slurry of the silica in toluene, heating the mixture for several hours, reacting ("BuCp)$_2$ZrCl$_2$ in toluene solvent with the MAO/silica support, and drying the catalyst under vacuum. The catalyst may be used, e.g., to catalyze copolymerization of ethylene with 1-hexene.

The inventors have synthesized supported metallocene catalysts by impregnating methylaluminoxane (MAO) on the support itself and conducted polymerization trials without separately feeding MAO. The present method uses silica as the support because of its stability at high temperatures; its availability with varying pore sizes, volumes and surface areas; its low price; and its very large volume usage by industry. The metallocene catalyst ("BuCp)$_2$ZrCl$_2$ was selected because of its stability, commercial availability at a reasonable price, capability of polymerizing ethylene with high activity in solution, and considerable use by researchers in the synthesis of supported metallocene catalysts.

The present method particularly relates to copolymerizing ethylene with 1-hexene using the supported metallocene catalysts.

Silica is amorphous and heterogeneous, comprising tetrahedral SiO$_4$ units, siloxane bridges (Si—O—Si)$_n$, and silanols RSi—OH as surface terminations. Siloxane bridges can be typically 6-membered rings, while silanols can be germinal, vicinal, and isolates as shown in the following example formulas.

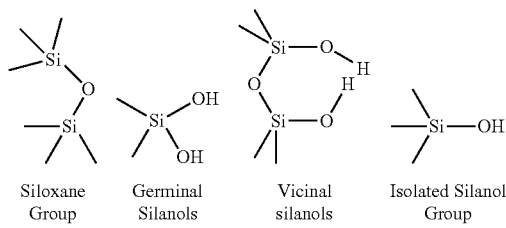

| Siloxane Group | Germinal Silanols | Vicinal silanols | Isolated Silanol Group |

MAO is represented by the formula (AlOMe)$_n$(AlMe$_3$)$_m$, where n ranges from 6 to 13 and m is between 1 and 4. It maintains a cage structure having dynamic equilibrium between trimethylaluminum (TMA) and oligomers of MAO (—CH$_3$OAl—)$_n$. The cage structure features four-coordinate Al and three coordinate O centers, comprising Al—O and Al-Me bonds. "BuSnCl$_3$ is a group 14 organo-Lewis acid linker/spacer with partial positive charge (δ+) at the Sn metal center. ("BuCp)$_2$ZrCl$_2$ does not undergo conformational isomorphic interconversion. Strong chain transfer to 1-hexene is likely to occur provided the copolymer molecular weight drops significantly. Finally, MAO is not separately fed into the reactor as a co-catalyst. Therefore, there will be no competing co-diffusion of MAO and ethylene from the polymerization medium to the catalyst active centers.

As discussed above, silica and MAO are the two major sources of chemical heterogeneity. Consequently, the proposed supported catalysts silica/MAO/($^n$BuCp)$_2$ZrCl$_2$ (Catalyst 1) and silica/$^n$BuSnCl$_3$/MAO/($^n$BuCp)$_2$ZrCl$_2$ (Catalyst 2) are likely to introduce a catalyst active center distribution t can be (i) represented by the number of active center types and (ii) determined by modeling the measured polymer backbone microstructures (MWD and CCD). We also assess the effects of this catalytic characteristic on copolymerization activity, polymerization mechanism, catalyst surface chemistry, co-monomer and segregation effects, and selected polymer microstructures.

The present disclosure further relates to (1) assessing the influence of the $^n$BuSnCl$_3$ linker and supported MAO anion on polymerization activity and polymer backbone microstructure; (2) elucidating the catalyst active center distribution by simultaneous deconvolution of the measured MWD and CCD; (3) explaining the observed catalyst active center distribution from the perspective of heterogeneity in silica structure and dynamic equilibrium between TMA and oligomers of MAO (($-CH_3OAl-$))$_n$ in MAO, that is, in terms of variation in electronic and local steric effects of the MAO-tethered silica on ($^n$BuCp)$_2$ZrCl$_2$; and finally, evaluating the effects of the above active center distribution on copolymerization activity, polymerization mechanism (initiation, propagation and chain transfer/termination), co-monomer and segregation effects, catalyst surface chemistry and selected polymer backbone microstructure (MWD and CCD).

Catalyst 1 (silica/MAO/($^n$BuCp)$_2$ZrCl$_2$) and Catalyst 2 (silica/$^n$BuSnCl$_3$/MAO/($^n$BuCp)$_2$ZrCl$_2$) were synthesized under argon atmosphere using standard Schlenk techniques. The solvents used were dried using 4 Å molecular sieve. The required amount of silica was dehydroxylated at 250° C. for 4 hours using a Thermocraft furnace equipped with a vertical quartz glass tube, a digital temperature indicator and a controller, a gas flow meter and a vacuum pump. The silica was continuously fluidized during dehydroxylation using nitrogen. Upon completion of dehydroxylation, it was stored in an inert glove box.

EXAMPLE 1

Synthesis of Catalyst 1 [Silica/MAO/($^n$BuCp)$_2$ZrCl$_2$]

Catalyst 1 was prepared by slurrying the dehydroxylated silica with de-moisturized (dried) toluene in a specially designed Schlenk flask. Methylaluminoxane (MAO) was added to this slurry drop by drop under argon atmosphere and under constant stirring at room temperature. Then this mixture was heated for several hours. Finally, ($^n$BuCp)$_2$ZrCl$_2$, dissolved in dried toluene, was reacted with the above mixture for a defined period of time. The synthesized catalyst was dried under vacuum. The catalyst, upon drying, turned free-flowing and was stored in a glove box.

EXAMPLE 2

Synthesis of Catalyst 2 [silica/$^n$BuSnCl$_3$/MAO/($^n$BuCp)$_2$ZrCl$_2$]

The dehydroxylated silica was first functionalized using $^n$BuSnCl$_3$ as follows. The required amount of silica was placed in a specially designed Schlenk flask under argon. Then it was slurried with de-moisturized toluene under magnetic stirring. Next, $^n$BuSnCl$_3$ was injected into the silica-toluene slurry. The resulting mixture was refluxed to tether $^n$BuSnCl$_3$ to silica. The functionalized silica was dried to free-flowing particles under vacuum and stored in a glove box. The remaining catalyst synthesis work followed that of Catalyst 1. That is, the dehydroxylated silica functionalized with $^n$BuSnCl$_3$ was slurried with de-moisturized (dried) toluene in a specially designed Schlenk flask. Methylaluminoxane (MAO) was added to this slurry drop by drop under argon atmosphere and under constant stirring at room temperature. Then, this mixture was heated for several hours. Finally, ($^n$BuCp)$_2$ZrCl$_2$, dissolved in dried toluene, was reacted with the above mixture for a defined period of time. The synthesized catalyst was dried under vacuum. The catalyst, upon drying, turned free-flowing and was stored in a glove box.

Elemental composition and particulate properties of the synthesized supported catalysts (Catalyst 1 and Catalyst 2) were determined in terms of Si, Al, Sn, and Zr content using inductively coupled plasma (ICP) spectrometry (ICP Spectro Ciros Vision, FVE 12-Axial). About 0.1-0.25 g of each catalyst sample was weighed in a 50 mL polyethylene bottle. The samples were digested in 5 mL of aqua regia and heated to near dryness. About 30 mL of distilled water was added to the sample, which was then mixed, heated and filtered. The volume of the final sample solution was adjusted to 20 mL for ICP spectral analysis.

The particle size distribution of the catalyst samples was measured using a computer-interfaced Mastersizer 2000 particle size analyzer (Malvern Instruments, UK). This instrument works on the principle of laser diffraction. It was equipped with a 50 to 120 mL capacity Hydro 2000S liquid feeder, which has a built-in ultrasound probe with an online pump and a stirrer. First, the liquid feeder was cleaned using deionized water. The background signal of water in the dispersant tank was measured. Then, a small amount of the catalyst sample (about 0.5 g) that shows an obscursion limit of ca. 5.0% was dispersed in deionized water. The optical properties of the samples were selected from the library of materials available in the provided software. Each sample was analyzed using five cycles having various stirrer speeds and different intensities of ultrasound. The particle size distribution and its average were calculated using Mie theory. The average particle size and the span of particle size distribution of each catalyst are reported in Table 1, Table 1 also lists the concentrations of these metals measured in the synthesized catalysts.

TABLE 1

Elemental composition and particulate properties of synthesized catalysts

| Catalyst composition/ particulate properties | Units | Catalyst 1 | Catalyst 2 |
|---|---|---|---|
| Silicon (Si) | wt % | 28.43 | 19.08 |
| Aluminum (Al) | wt % | 67.78 | 73.49 |
| Tin (Sn) | wt % | None | 3.76 |
| Zirconium (Zr) | wt % | 3.70 | 3.66 |
| Al:Zr molar ratio | Dimensionless | 61.89 | 67.83 |
| Volume-weighted mean particle size | μm | 47.545 | 56.283 |
| Span of particle size distribution | Dimensionless | 1.812 | 1.662 |

TABLE 1-continued

Elemental composition and particulate properties of synthesized catalysts

| Catalyst composition/ particulate properties | Units | Catalyst 1 | Catalyst 2 |
|---|---|---|---|
| Homopolymerization activity | kg PE (g cat)$^{-1}$ h$^{-1}$ × 10$^2$ | 20.0 | 1.0 |
| Copolymerization activity | kg PE (g cat)$^{-1}$ h$^{-1}$ × 10$^2$ | 52.5 | 27.0 |

Polymerization conditions: medium, 240.0 mL, n-hexane; 1-hexene, 10.0 mL; scavenger, 1.0 mL of 1.0 mol L$^{-1}$ TIBA; temperature, 50° C.; mode of polymerization trial, continuous feeding of ethylene at 5 bar (g).

EXAMPLE 3

Synthesis of Ethylene Polymers and Copolymers

Ethylene was homo- and copolymerized using a computer-interfaced AP Miniplant laboratory-scale reactor setup. It consisted of a fixed top head and a 1 L jacketed Buchi glass autoclave. The glass reactor was baked for 2 hours at 120° C. Then it was purged with nitrogen four times at the same temperature. The reactor was cooled from 120 to 40° C. About 200 mL, of dried n-hexane was transferred to the reactor. Then 1.0 mL of 1.0 mol L$^{-1}$ TIBA was added to scavenge the impurities that may poison the catalyst. The mixture was stirred for 10 minutes. Then, the n-hexane was dried by contacting it with 4 Å molecular sieves at room temperature overnight, which decreased the moisture level to less than 10 ppm. The molecular sieve was activated at 230° C. At this stage, for the copolymerization, 10 mL of 1-hexene was added. The resulting mixture was stirred at 50 rpm for 10 minutes. For the homopolymerization reaction, no 1-hexene was introduced.

Then, either catalyst 1 or 2 was slurried in 50 mL of n-hexane. The whole volume was siphoned into the reactor under mild argon flow. Ethylene was polymerized by passing it through oxygen- and moisture-removing columns, and finally feeding it into the reactor at 5 bar(g). The polymerization temperature and stirrer speed were set at 50° C. and 750 rpm, respectively. The trial was continued for 1 hour. Stopping the ethylene flow and venting the post-polymerization ethylene (in the reactor) to the atmosphere quenched the polymerization. Then, the data acquisition was stopped, the stirrer speed was reduced to about 100 rpm and the reactor was gradually cooled to room temperature.

Upon completion of the polymerization trials as described above, the reactor was opened; and the resulting polymer was dried under ambient conditions in a hood and weighed to obtain the yield. This was subsequently used to determine the corresponding catalyst activity, which is reported above in Table 1. Using each catalyst, one homopolymer and one copolymer were synthesized, the morphology of which was evaluated as follows.

The polymer particulate morphology is defined in terms of bulk density and particle size distribution. The bulk density was measured using a graduated measuring cylinder. A given mass of the polymer particles was introduced into it. The volume was measured after properly stirring the cylinder. The polymer particle size distribution was evaluated as was done for the catalyst. The overall polymer particulate morphology and properties are summarized in Table 2.

TABLE 2

Characteristic properties of the synthesized ethylene homopolymers and copolymers

| Polymer properties | Units | Copolymer 1 | Copolymer 2 |
|---|---|---|---|
| Volume-weighted mean particle size | μm | 189.029$^a$, 225.354 | 113.514$^a$, 226.188 |
| Span of particle size distribution | Unitless | 1.417$^a$, 1.615 | 1.247$^a$, 1.657 |
| Particle bulk density | g mL$^{-1}$ | 0.272$^a$, 0.290 | 0.300$^a$, 0.299 |
| Polymer material density, $d_{polym}{}^b$ | g mL$^{-1}$ | 0.951$^a$, 0.918 | 0.951$^a$, 0.926 |
| Weight-average molecular weight, $M_w$ | g mol$^{-1}$ | 166678$^a$, 74435 | 370126$^a$, 80342 |
| Polydispersity index | None | 5.496$^a$, 3.8152 | 6.2424$^a$, 3.5789 |
| Peak melting point, $T_{pm}$ | ° C. | 133.30$^a$, 118.07 | 133.32$^a$, 121.62 |
| Peak crystallization point, $T_{pc}$ | °C | 116.01$^a$, 105.24 | 118.82$^a$, 110.60 |
| Crystallinity, $X_c$ | % | 79.60$^a$, 43.69 | 68.98$^a$, 2.94 |
| Breadth of composition distribution, a | ° C. | 9.23 | 5.69 |
| Average 1-hexene composition | mol % | 2.51 | 2.05 |
| Terminal vinyl × 10$^3$ (CH$_2$=CHR) | Number per 1000 C | 0.12014 | 0.37950 |
| Vinylidene × 10$^3$ (CH$_2$=CR$_1$R$_2$; R$_1$ ≠ R$_2$) | Number per 1000 C | 1.90753 | 1.68269 |
| trans-Vinylene × 10$^3$ (R$_1$CH—CHR$_2$; R$_1$≠R$_2$) | Number per 1000 C | 0.67355 | 0.84091 |
| Total vinyl unsaturation × 10$^3$ | Number per 1000 C | 2.70122 | 2.90310 |

$^a$Values for the corresponding homopolymers
$^b$Calculated using the semi-empirical relation: $d_{polym}$ (material density) = ($T_{pm}$ + 306)/462.

The catalyst and the polymer particulate surface morphologies were evaluated in the following manner. The catalyst and the experimental polyethylene samples were first coated with a layer of carbon to increase the surface conductivity. These coated samples were characterized using a scanning electron microscope equipped with an energy dispersive X-ray spectrometer. The particulate morphology was evaluated by operating the electron microscope in the backscattered electron imaging mode.

The molecular weights and polydispersity indices were evaluated as follows. The synthesized ethylene homo- and copolymers were characterized in terms of molecular properties (weight-average molecular weight (Mw) and polydispersity index) using gel permeation chromatography (GPC; Polymer Laboratories GPC 220, UK). A PLgel 10 μm mixed-B column was used. The column temperature was kept constant at 160° C.

The antioxidant BHT (0.0125 wt %) was added to TCB (solvent) to prevent the polymer samples from degrading. Then, 2.8 mg of polymer sample was placed in a 1.5 mL vial, which was dissolved in 1.0 mL of stabilized TCB as follows. The polymer-containing sample vials were placed in the warming compartment of the GPC instrument at 90° C. for about 1 hour. During this period, the vials were shaken every 15 minutes to completely dissolve the polymers.

Before injecting the samples, the differential refractive index detector was purged for 4 h using TCB (1 mLmin$^{-1}$) to obtain a stable baseline. In contrast, the inlet pressure and differential pressure outputs were purged for 1 hour.

The sample injection volume and flow rate were 100 μL and 1.0 mL min$^{-1}$, respectively. The instrument was calibrated using nine polystyrene standards whose peak molecular weights ranged from 2,608,000 to 1530 g mol$^{-1}$. The polystyrene calibration curve was converted into the corresponding polyethylene calibration curve using the Mark-Houwink constants of both polymers. The run time for each sample was 20 minutes. Cirrus single detector software was used to calculate the average molecular weights and the polydispersity indices, which are reported in Table 2.

The thermal properties and thermal melt fractionation were evaluated in the following manner. The thermal properties of the experimental resins and films were measured in terms of peak melting point ($T_{pm}$) and crystallinity using a differential scanning calorimeter (DSC Q2000, Texas Instruments). The instrument was calibrated using indium.

About 4.0±0.2 mg of sample was put in an aluminum pan, which was tightly closed with a lid. A sealed aluminum pan was used as a reference. The samples and the reference were placed in the experimental carrousel. The samples were heated at 10° C. min$^{-1}$ from room temperature to 160° C. at a nitrogen flow rate of 50 mL min$^{-1}$ (cycle 1). After this, they were isothermally heated for 5 minutes to remove the influence of the thermal history and unmelted crystals that could cause heterogeneous crystallization. Next, the sample was cooled from 160 to –5° C. at the thermal ramp described above (cycle 2) and was kept at this temperature for 5 minutes. Finally, the same sample was reheated at 10° C. min$^{-1}$ to 160° C. (cycle 3).

The peak melting temperature ($T_{pm}$) and crystallinity were determined from cycle 3, whereas the peak crystallization temperature ($T_{pc}$) was obtained from cycle 2. The thermogram under the cycle 3 fusion endotherm was integrated to measure the heat of fusion ($H_f$), which is proportional to the crystallinity of the polymer. The crystallinity was calculated from $\Delta H_f$ (J g$^{-1}$)/$\Delta H_{std}$ (J g$^{-1}$), where $\Delta H_{std}$ is the heat of fusion for a perfectly crystalline polyethylene. This is equal to 290.0 J g$^{-1}$. The data for each cycle were acquired and handled using TA explorer software. The material density $d_{polym}$ was calculated using $T_{pm}$. Table 2 reports the thermal properties, obtained as described above, of the as-synthesized polyethylene.

The polymers were thermally fractionated using the DSC instrument mentioned above, and following the successive self-nucleation and annealing (SSA) experimental procedure reported in the literature. We applied seven annealing steps (160, 125, 119, 114, 111, 107 and 103° C.).

The copolymer composition distribution was evaluated as follows. The composition distribution of Copolymer 1 and Copolymer 2 was determined using the crystallization fractionation technique known as Crystaf. The fractionation principle is summarized as follows. The dissolved polymer was sampled at even time intervals and the polymer solution concentration was measured, while the solution was cooled at a constant rate. A copolymer with lower co-monomer content crystallizes from the solution at a higher temperature than the one with a higher co-monomer content (more short-chain branches). The Crystaf crystallization profile shows the co-monomer incorporation level in a copolymer, as well as the way in which the co-monomer is distributed along the backbone.

For measuring the composition distribution, Polymer Char CRYSTAF 100 was used. Sample solution of concentration 0.1% (w/w) in TCB was prepared at 160° C. under stirring for 60 minutes. The solution was equilibrated at 95° C. for 45 min. This was subsequently crystallized at a cooling rate of 0.2° C. min$^{-1}$ from 95 to 35° C. The qualitative differential composition distribution (dw/dT versus T) was obtained by numerical differentiation of the integral analogue. This was finally converted into the quantitative version using a calibration curve developed in our laboratory.

The copolymer microstructure and sequence length distribution were evaluated as follows. The microstructural parameters, including average short-chain branch content and 1-hexene mole percentage in the synthesized copolymers, were determined using $^{13}$C nuclear magnetic resonance (NMR) spectroscopy. For this purpose, a Bruker 600 MHz AVANAC III spectrometer was used. The spectra were recorded using a DEPT (distortionless enhancement by polarization transfer) 135 pulse sequence, and they were analyzed using Bruker Topspin 2.1 software. The receiver gain was set at 203. Exponential line broadening of 1 Hz was applied before Fourier transformation. DEPT was used because of its prioritized advantages that include enhanced $^{13}$C signal sensitivity; superior spectral editing; and capability to distinguish methyl $CH_3$, methylene $CH_2$ and methine CH sites, and to identify branches. The 1-hexene mole percentage was calculated in the synthesized copolymers by quantifying the butyl branch, following the published literature.

The copolymer microstructural parameters were calculated following well-known published methods. In this matter, the calculation of the triad sequences in the $^{13}$C NMR spectrum forms the basis, which we accomplished by applying the peak assignment procedures reported earlier. First, the various triad mole fractions were determined using the Seger-Maciel algorithm and the associated collective peak assignment regions. Because the concentration of a given triad is proportional to the algebraic expression of the concerned peak areas, this algorithm does not require signal calibration.

Table 3 lists the triad mole fractions of copolymers 1 and 2. Next, the monad and diad mole fractions and the copolymer microstructural parameters of interest were calculated.

TABLE 3

Average Copolymer Composition and Triad Sequence Mole Fractions[a]

|  | Catalyst 1[b] Copolymer 1 Avg. Copolymer Mole Fraction | Catalyst 2[c] Copolymer 2 Avg. Copolymer Mole Fraction |
|---|---|---|
| [E] | 0.962 | 0.982 |
| [H] | 0.038 | 0.018 |
| Triad Mole Fraction[d] | | |
| [EEE] | 0.915 | 0.953 |
| [EEH] | 0.047 | 0.029 |
| [HEH] | 0.000 | 0.000 |
| [EHE] | 0.028 | 0.014 |
| [EHH] | 0.010 | 0.004 |
| [HHH] | 0.000 | 0.000 |

[a]E = ethylene, H = 1-hexene. HEE,⇔EEH; EHH⇔HHE.
[b]Catalyst 1: silica/MAO/($^n$BuCp)$_2$ZrCl$_2$
[c]Catalyst 2: silica/$^n$BuSnCl$_3$/MAO/($^n$BuCp)$_2$ZrCl$_2$
[d]Calculated using the collective peak assignment algorithm of Seger and Maciel.

Table 4 reports the copolymer microstructural parameters.

TABLE 4

Comparison of Microstructural Parameters for Copolymer 1 and Copolymer 2

| Parameter | Value for a Bernoullian ethylene-1-hexene copolymer | Value for a first-order Markovian ethylene 1-hexene copolymer | Copolymer 1 | Copolymer 2 |
|---|---|---|---|---|
| Run number | — | — | 2.355 | 1.448 |
| Average sequence length | — | — | — | — |
| $n_E$ NMR | — | — | 40.853 | 67.821 |
| $n_H$ NMR | — | — | 1.146 | 1.117 |
| $n_E$ MPNMR-Flory | — | — | 40.000 | 55.000 |
| $n_E$ MPDSC-GT | — | — | 42.859 | 50.197 |
| Persistence ratio, ρ | — | 1 | 1.103 | 1.097 |
| Random parameter, $\chi_R$ | — | — | 0.907 | 0.912 |
| Cluster Index | — | 10 | 34.311 | 58.416 |
| $\Omega_E$ | 1 | 1 | 0.987 | 0.997 |
| $\Omega_H$ | 1 | 1 | ∞ | ∞ |
| $r_E$ | — | — | 76.928 | 162.256 |
| $r_H$ | — | — | 0.054 | 0.043 |
| first-order Markov reactivity ratio product, $r_E r_H$[b] | 1[a] | 1[a] | 4.110 | 6.973 |
| average reactivity ratio product, $<r_E r_H>$[b] | 1[a] | 1[a] | 4.152 | 6.986 |

Figure 10:
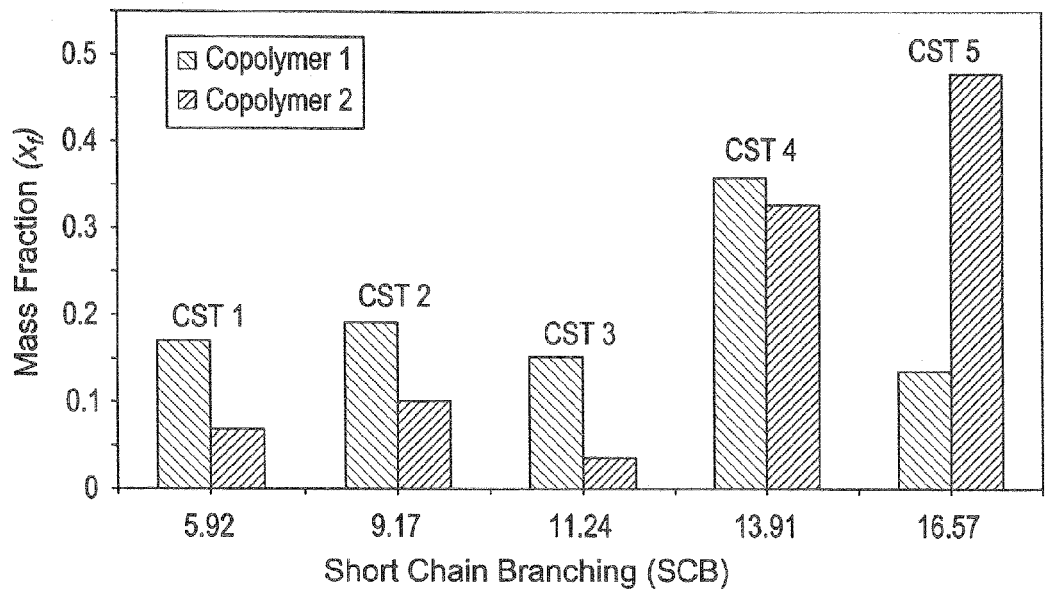
FIG. 10 is a chart showing a comparison of discrete Short Chain Branching (SCB) distributions of copolymer 1 and copolymer 2, determined using the SSA DSC technique, where CST=Schulz-Flory and Stockmayer catalyst site type.

[a]Holds for a single-site catalyst; for a multiple catalyst, $r_E r_H$ or $<r_E r_H>$ ≫ 1.
[b]Estimated. E = ethylene, H = 1-hexene. $n_{E\ MPNMR-Flory}$ and $n_{E\ MPDSC-GT}$ were determined from FIGS. 10 and 11 respectively.

The average 1-hexene composition (mol %) in the synthesized copolymers was determined by measuring the short-chain branch content using $^{13}$C NMR spectroscopy. For this purpose, a Bruker 600 MHz AVANAC III spectrometer was used. This instrument was equipped with a Bruker 5 mm broadband observe multinuclear probe. The experimental samples were prepared by dissolving about 50-60 mg of the polymer sample in about 0.55 mL of deuterated TCB at 30° C., and using a 5 mm NMR tube. The spectra were recorded using DEPT135 pulse sequence, and analyzed using Bruker Topspin 2.1 software (Bruker BioSpin, Rheinstetten, Germany). The receiver gain was set at 203. Exponential line broadening of 1 Hz was applied before Fourier transformation.

For the butyl branch, the following peaks do not overlap with the main CH$_2$: two α-CH$_2$, two β-CH$_2$ and one CH at the branch point, and the methyl, first and third CH$_2$ from the branch end. Therefore, the butyl branches per 1000 C atoms, N, can be estimated using the following expression:

$$N = \frac{I_\beta}{5I_\beta + 2I_{main} + 3I_\beta} \times 1000 \quad (1)$$

where $I_\beta$ is the integral intensity of the β-methylene (—CH$_2$—) peak with respect to the branch point (=2× integral intensity of the methyl (Me) peak) and $I_{main}$ is the integral of the main/backbone methylene (—CH$_2$—) peak.

Considering a polyethylene backbone of 1000 C atoms with N pendant butyl groups, we can state that the number of 1-hexene units is N and the number of ethylene units is (1000−2N)/2. Therefore, the composition of 1-hexene will be given by the following expressions:

$$1\text{-Hexene(mol \%)} = \frac{N}{[(1000-2N)/2]} \times 100 = \frac{N}{5}, \text{ and} \quad (2)$$

$$1\text{-Hexene(wt \%)} = \quad (3)$$

$$\frac{(N/5) \times MW_{1-hexene}}{(N/5) \times MW_{1-hexene} + (100 - N/5) \times MW_{ethylene}} \times 100.$$

The determination of vinyl unsaturation was divided into two parts. First, we made bubble-free polymer films, and second, we characterized them using Fourier transform infrared spectroscopy (FTIR). The film-making process is summarized below.

About 100 mg of copolymer sample was placed in the sample holder of a universal film maker. Then the temperature was increased to 145° C. A compressive load of 1.5×10$^3$ kg was applied to the molten polymer samples for about 4 minutes, and then the temperature was gradually decreased to 60° C. Finally, the pressure was released and the fabricated films were taken out. The measured thickness of the resulting films varied from 200 to 300 microns.

The vinyl unsaturation N$_{vunsat}$, in terms of the number of unsaturations per 1000 C atoms in the as-synthesized polyethylene, was determined using the following relationship and FTIR spectroscopy:

$$N_{vunsat} = \frac{No.(-CH=HC-)}{1000C} = FW_{methylene} \times \frac{A}{\rho t \epsilon} \quad (4)$$

where A is the integrated FTIR absorbance corresponding to the types of vinyl unsaturation—terminal vinyl, vinylidene and trans-vinylene (internal vinyl). They appear as FTIR spectral peaks at 908, 888 and 964 cm$^{-1}$ respectively. $FW_{methylene}$ is the formula weight of methylene, which equals 14. Parameter ρ is the film density in g cm$^{-3}$, t is the film thickness in cm, and ε is the molar extinction coefficient in Lmol$^{-1}$ cm$^{-1}$ for a specific vinyl unsaturation. Values of ε are available in the literature.

The catalytic synthesis of ethylene homo-and copolymers (with an α-olefin) is implicitly a statistical process. Consequently, the polymer backbones consist of a mixture of chains that can be represented by various single-site MWDs (molecular weight distributions) and CCDs (catalyst component distributions). Therefore, the deconvolution of the measured MWDs and CCDs (an inverse computational technique) was used to determine the number of active catalyst site types, that is, the catalyst active center distribution, and to model the corresponding backbone microstructures MWD and CCD.

Figure 1B:
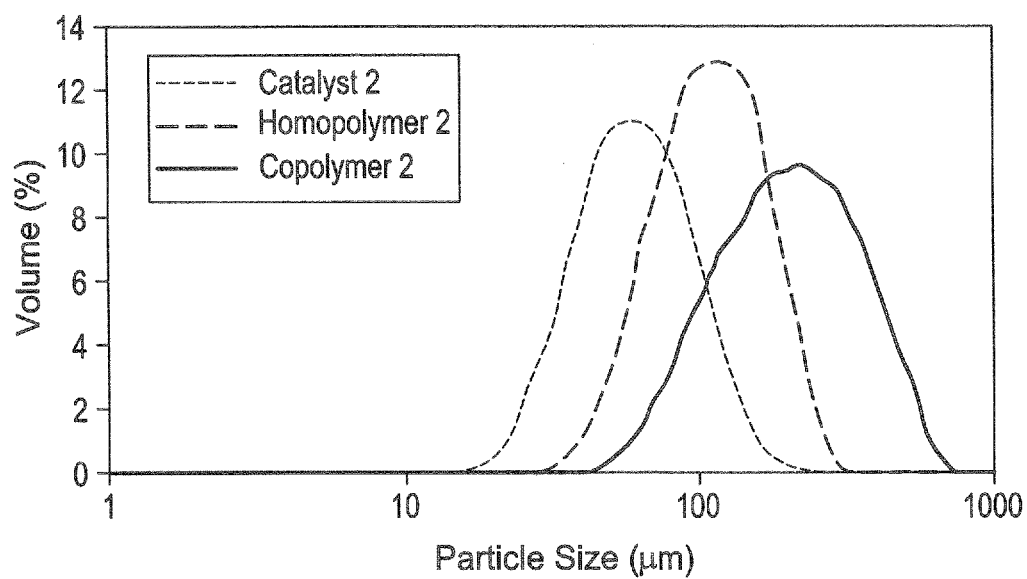
FIG. 1B is a graph showing a comparison of the particle size distribution of catalyst 2 (silica/"BuSnCl$_3$/MAO/nBuCp)$_2$ZrCl$_2$) with that of the corresponding ethylene homopolymer polymerization and copolymer 2.
Figure 2B:
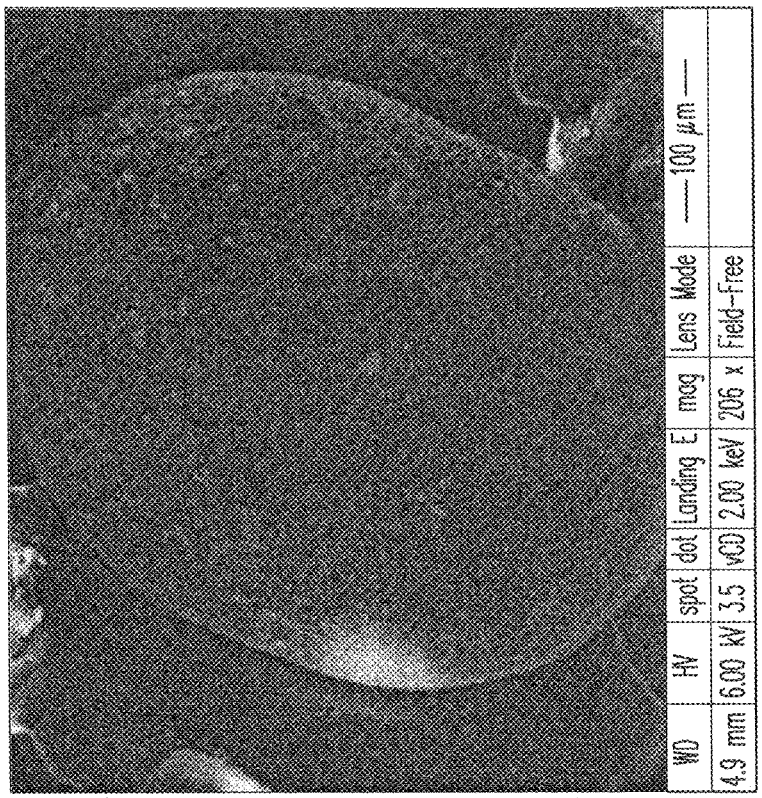
FIGS. 2A and 2B show SEM images of catalyst 1 and copolymer 1 particles prepared using catalyst 1.
Figure 2A:
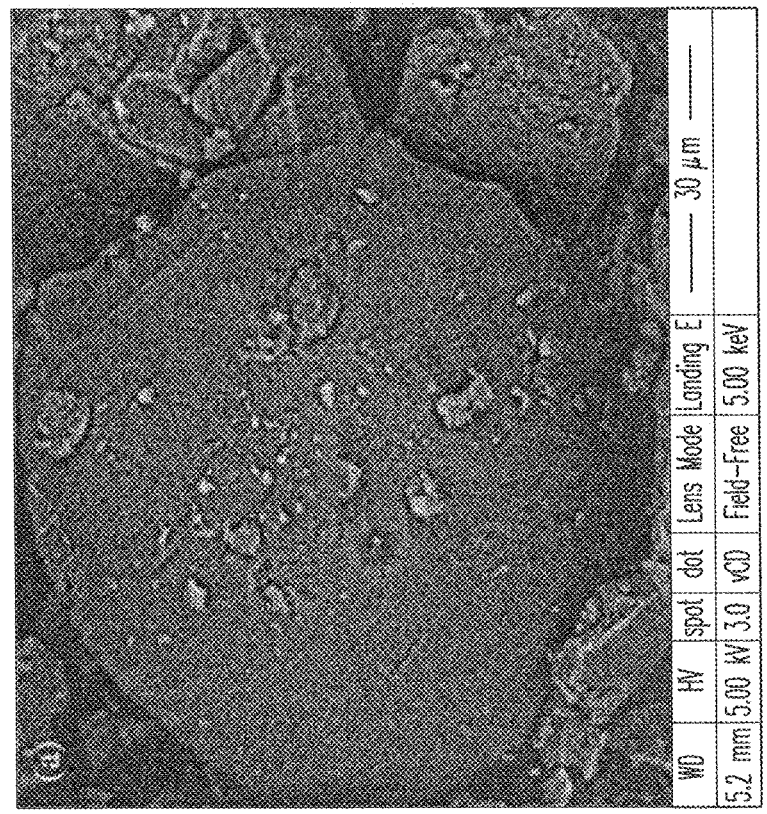
Figure 3:
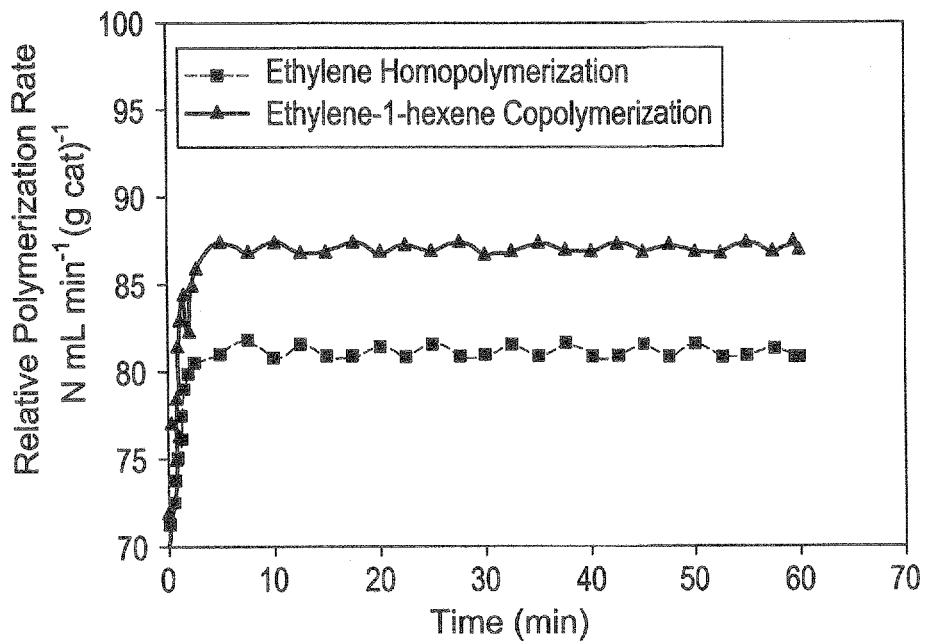
FIG. 3 is a chart showing the Kinetic Stability Profile of Catalyst 1 and Catalyst 2 during homopolymerization of ethylene and during copolymerization of ethylene with 1-hexene.

First, we evaluate the heterogeneous catalysis aspect of the synthesized catalysts (Catalyst 1 and Catalyst 2) under the experimental polymerization conditions by assessing the reactor performance and the particle size distribution of the resulting polyethylene. In the absence of separately feeding MAO, no reactor fouling is observed. Free-flowing polyethylene particles with an average bulk density of 0.30 g mL$^{-1}$ are obtained (Table 2). FIGS. 1A and 1B demonstrate that the measured polymer particle size distributions resemble those of the synthesized catalysts. This observation is also reflected by the corresponding SEM images (shown in FIGS. 2A-2D). FIG. 3 plots the relative activity of Catalyst 1 and Catalyst 2 during homo- and copolymerization as a function of polymerization time. We calculated the relative activity using the following expression:

$$a_{rel} = \frac{(Q_{Cat1}/W_{Cat1}) - (Q_{Cat2}/W_{Cat2})}{\Delta t}, \quad (5)$$

where $Q_{Cat1}(t)$ and $W_{Cat1}$ are, respectively, the cumulative flow rate (during homo- or copolymerization) and the weight of Catalyst 1; $Q_{Cat2}(t)$ and $W_{Cat2}$ are the analogs for Catalyst 2; and $\Delta t$ is the incremental data acquisition time. $Q_{Cat1}(t)$ and $Q_{Cat2}(t)$ are monitored using the mass flow meter, and finally acquired by the computer-assisted data acquisition system. FIG. 3, in essence, represents kinetic stability profiles of both catalysts. Each catalyst turns out to be very stable.

The above findings confirm the occurrence of the replication phenomenon from the catalyst to the resulting polymer. Because of fragmentation of the original catalyst particles and growth of polymer around these fragments, the polymer particle size increases. The absence of reactor fouling, the achievement of free-flowing polymer particles with good bulk density, and the manifestation of the replication phenomenon and catalyst stability establish the occurrence of heterogeneous catalysis in our study. We elaborate this specific catalytic behavior as follows.

In the absence of separate feeding of MAO, a polymer film is supposed to form instantaneously around the catalyst particles through polymerization by the active centers available on the surface of the supported catalysts. This coats/immobilizes the catalyst constituents with a surrounding shell and prevents leaching. This phenomenon is somewhat similar to conventional pre-polymerization that is practiced to feed supported olefin polymerization catalysts into an industrial plant. The SEM cross-sectional images (FIGS. 2A-2D) showing the dynamic growth of the polyethylene particles confirms that the polymer grows on the fragmenting catalyst particles, not in polymerization medium/solution.

Figure 4:
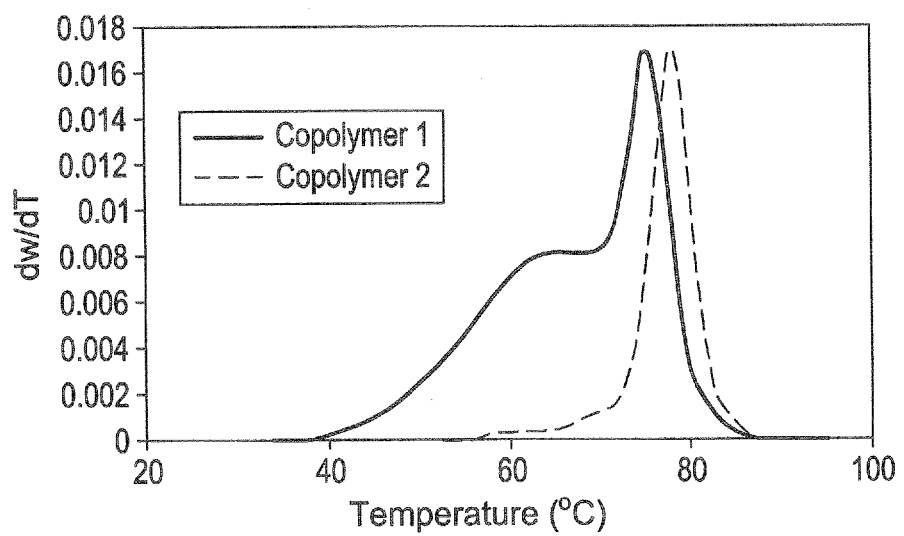
FIG. 4 are CRYSTAF curves showing the rate of precipitation (dw/dT) as a function of temperature, indicating the composition distribution of copolymer 1 and 2 prepared using catalyst 1 and 2, respectively.

FIG. 4 shows how the qualitative composition distribution of Copolymer 1 (synthesized using Catalyst 1), determined using Crystaf, differs from that of Copolymer 2 (synthesized using Catalyst 2). Copolymer 1 has a bimodal composition distribution. On the other hand, Copolymer 2 has a unimodal composition distribution. We quantitatively express this observed difference in composition distribution by reporting the root mean square crystallization temperature $T_\sigma$. Note that $T_\sigma$ measures the width of the distribution, and it is defined as follows:

$$T_\sigma = \sqrt{\frac{C_i(T_i^2 - T_w^2)}{\sum C_i}}$$

where $T_i$ is the i$^{th}$ x-axis data point and $$T_w = \frac{\sum C_i \times T_i}{\sum C_i}$$

is the weight-average crystallization temperature. $C_i$ is the concentration of the copolymer solution at $T_i$. The root mean square crystallization temperatures for Copolymer 1 and Copolymer 2 are 9.23 and 5.69° C., respectively. This physically means that the incorporation of 1-hexene per polyethylene backbone length (which generates the butyl side chain branch) is more uniform in Copolymer 2 than in Copolymer 1. The inventors explain this by considering the difference in catalyst composition and active site surface chemistry. In Catalyst 1, MAO is tethered on silica having isolated —OH Brönsted acid groups, and then ("BuCp)$_2$ ZrCl$_2$ is impregnated on this. In Catalyst 2, the isolated —OH Brönsted acid groups are converted into the corresponding Lewis acid moieties by functionalization with "BuSnCl$_3$ before loading MAO and ("BuCp)$_2$ZrCl$_2$. This transformation of silica surface acidity (Brönsted Lewis) and the subsequent interaction with MAO in Catalyst 2 make the resulting surface chemistry of the Catalyst 2 active site types differ from that of Catalyst 1. Below we discuss catalyst active center distribution that we have modeled using simultaneous deconvolution of MWD and CCD. Consequently, the Crystaf traces and the corresponding composition distributions of the copolymers vary.

Despite the differences discussed above, there are some common findings which we list below.

In both copolymers, the incorporation of 1-hexene decreases the peak melting and crystallization temperatures ($T_{mp}$ and Tpc) and crystallinity with reference to the corresponding homopolymers (Table 2). This is attributed to the structural/enchainment defect (FIGS. 5A and 5B) that results from the incorporation of 1-hexene, and the eventual partial disruption of the crystal package of the polyethylene chains.

FIG. 4 demonstrates that during Crystaf analysis, Copolymer 1 crystallizes as ethylene-rich to crystallizable ethylene-1-hexene fractions. On the other hand, Copolymer 2 crystallizes in the form of only an ethylene-rich fraction. An amorphous/rubbery ethylene-1-hexene soluble fraction is not present in either of them.

Figure 5A:
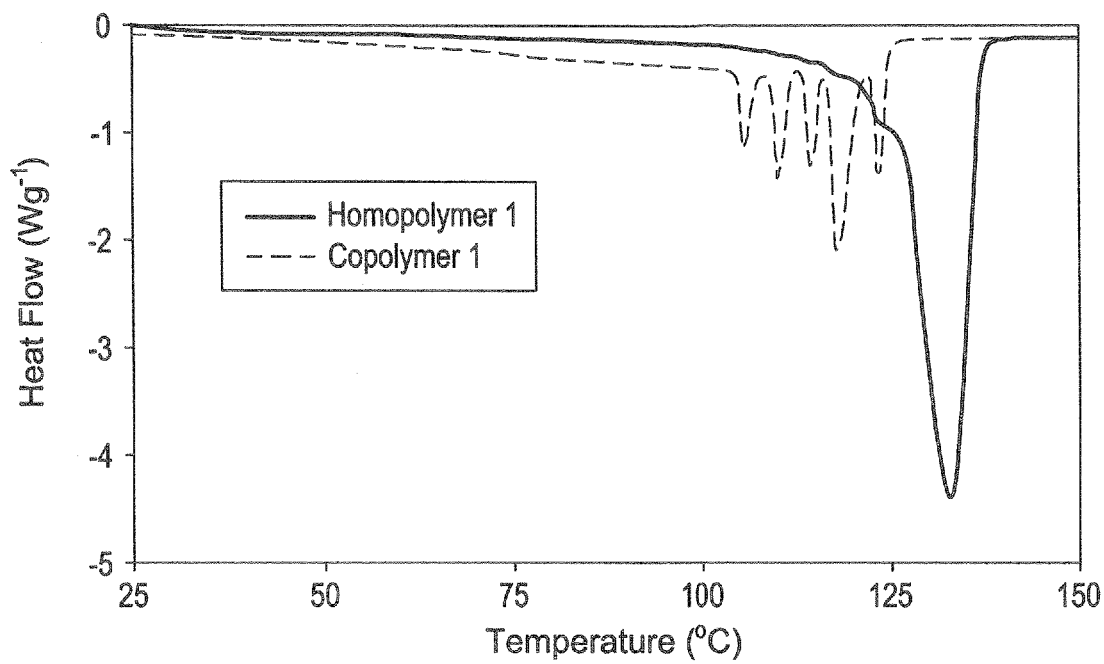
FIG. 5A is a graph showing the Successive Self-nucleation and Annealing (SSA) thermal fractionation of homopolymer 1 and copolymer 1.
Figure 5B:
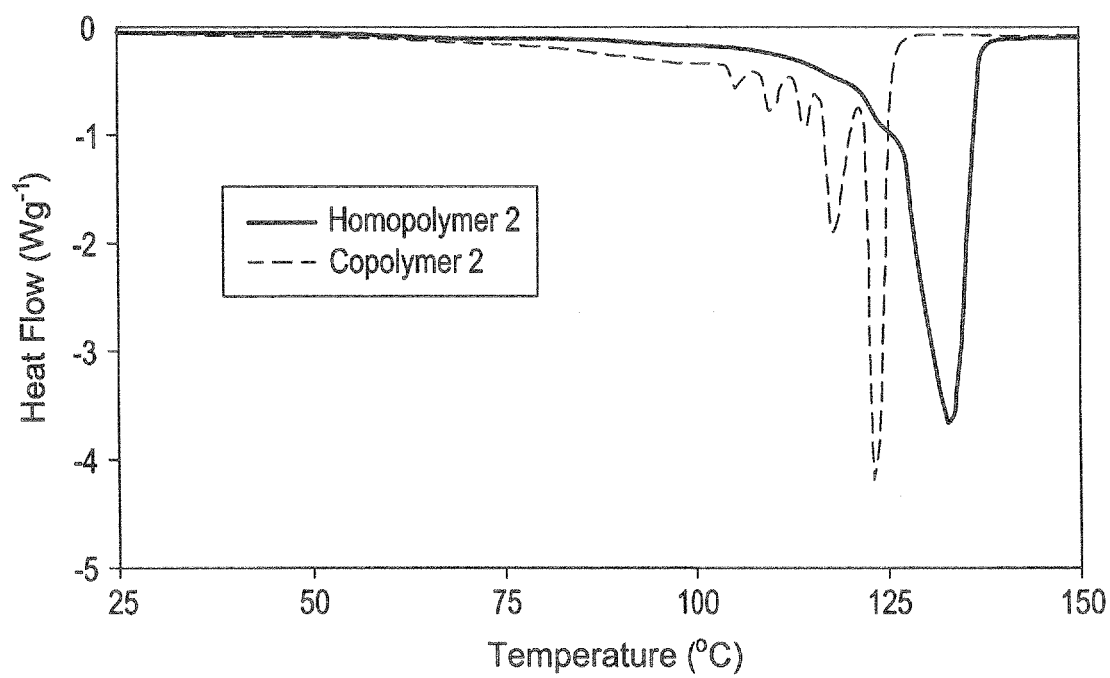
FIG. 5B is a graph showing the Successive Self-nucleation and Annealing (SSA) thermal fractionation of homopolymer 2 and copolymer 2.

Both copolymers show similar SSA fractionation results, that is, five distinct melting peaks at 105.40, 109.76, 114.01, 117.71 and 123.0° C. for Copolymer 1 and at 105.19, 109.56, 113.83, 117.73 and 123.30° C. for Copolymer 2 (FIGS. 5A, 5B). The corresponding homopolymers, being linear, do not demonstrate, unlike the copolymers, any multiplicity of melting peaks. Therefore, the SSA trace of each copolymer also qualitatively indicates the structural/enchainment defect introduced by the butyl branch that results from the incorporation of 1-hexene. Note that the SSA resolution is better than that of Crystaf. Therefore, the intra- and inter-copolymer backbone heterogeneity is comparable, although we noted a difference in the Crystaf traces (monomodality versus bimodality). However, the corresponding homopolymer, in each case, consists of fairly straight-chain backbones. Each SSA peak signifies a population of backbones that have the same branch content, crystallinity and lamellar thickness. The branch content is inversely related to crystallinity and lamellar thickness. However, the latter two are usually directly proportional. Therefore, the branch content decreases, and the crystallinity and lamellar thickness increase with the increase in these peak melting temperatures. Note that in SSA fractionation, the polymer undergoes multiple alternate melting and crystallization processes (without physical separation of the chains) as the temperature decreases. Therefore, it is sensitive to linear and uninterrupted methylene chain sequences and hence to both intra- and intermolecular defects.

Now we compare the CCD findings discussed above with those reported for other similar supported metallocenes applied to the copolymerization of ethylene with 1-hexene. Such a comparison shows that the shape of the Crystaf trace (monomodality versus bimodality) depends on several factors, such as support and metallocene types, support modification, amount of 1-hexene fed, etc. We reviewed these published studies and note the following. The genesis of such findings has not been adequately addressed by considering the occurrence of heterogeneous catalysis, copolymerization segregation effects, the catalyst active center types, steric and electronic effects of the silica-tethered MAO on the metallocene, the supported catalyst surface chemistry, and thermal fractionation of the copolymer melt (SSA experiments). Therefore, we particularly look into this subject from these perspectives, aiming at achieving further insights. This is what we discuss below, including other motifs that relate to our objectives.

Figure 6A:
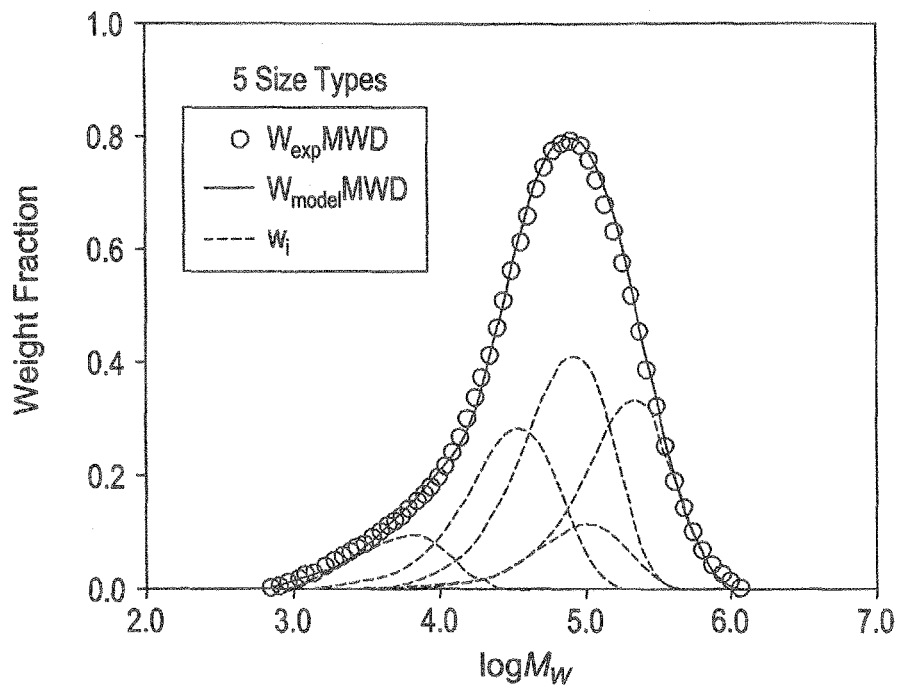
FIG. 6A depicts a model-predicted Schulz-Flory and Stockmayer Molecular Weight Distribution (MWD) of copolymer 1 with catalyst 1 active site types.
Figure 6B:
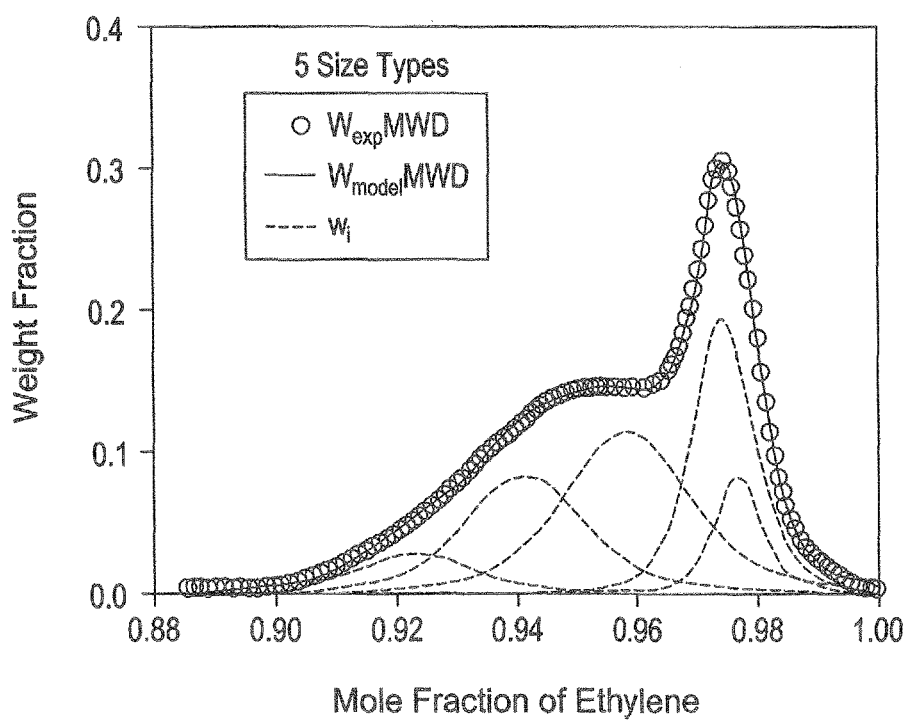
FIG. 6B depicts a model-predicted Schulz-Flory and Stockmayer Copolymer Composition Distribution (CCD) of copolymer 1 with catalyst 1 active site types.

FIGS. 6A and 6B show the model-predicted Schulz-Flory and Stockmayer MWD and CCD, respectively, for Copolymer 1 that we calculated from the simultaneous deconvolution of the measured MWD and CCD. Table 5 shows the estimated model parameters of each catalyst site type in Catalyst 1.

TABLE 5

Catalyst site types and the estimated Schulz-Flory and Stockmayer model parameters for Catalyst 1

| Model Parameters | Active Catalyst Site types | | | | |
|---|---|---|---|---|---|
| | 1 | 2 | 3 | 4 | 5 |
| Predicted active catalyst types | | | 5 | | |
| $\chi^2 \times 10^3$ | 7.05 | | | | |
| $m_i$ | 0.0760 | 0.2312 | 0.3329 | 0.0900 | 0.2699 |
| $M_{ni}$ (g mol$^{-1}$) | 3088 | 17 707 | 42 097 | 51 375 | 109 525 |
| Ii (number of C$_2$H$_4$ repeat units) | 110 | 632 | 42097 | 1 835 | 3 912 |
| $\overline{F}_1{}^a$ | 0.9225 | 0.9409 | 1 503 | 0.9766 | 0.9743 |
| $\beta_i$ | 0.0203 | 0.1222 | 0.9581 | 0.0612 | 0.2088 |
| $\tau_i \times 10^3$ | 9.0773 | 1.5813 | 0.3285 | 0.5450 | 0.2556 |
| Activity per site type (×10$^3$ kg PE (g cat)$^{-1}$ h$^{-1}$) | 39.90 | 121.38 | 0.6651 | 47.25 | 141.70 |

$^a$Mole fraction of ethylene in the copolymer

Figure 7A:
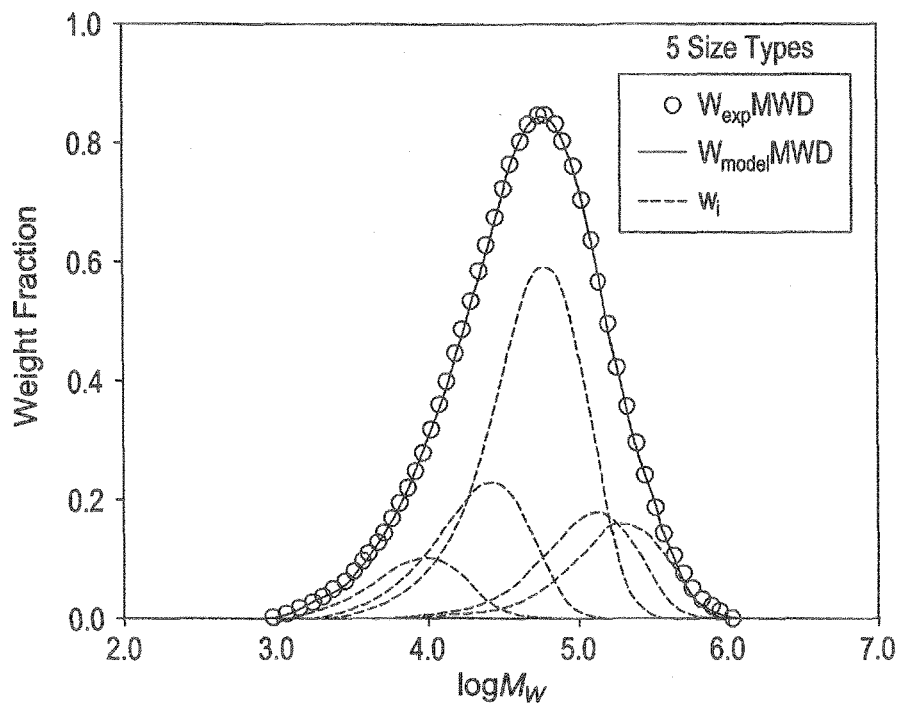
FIG. 7A depicts a model predicted Schulz-Flory and Stockmayer Molecular Weight Distribution (MWD) of copolymer 2 with catalyst 2 active site types.
Figure 7B:
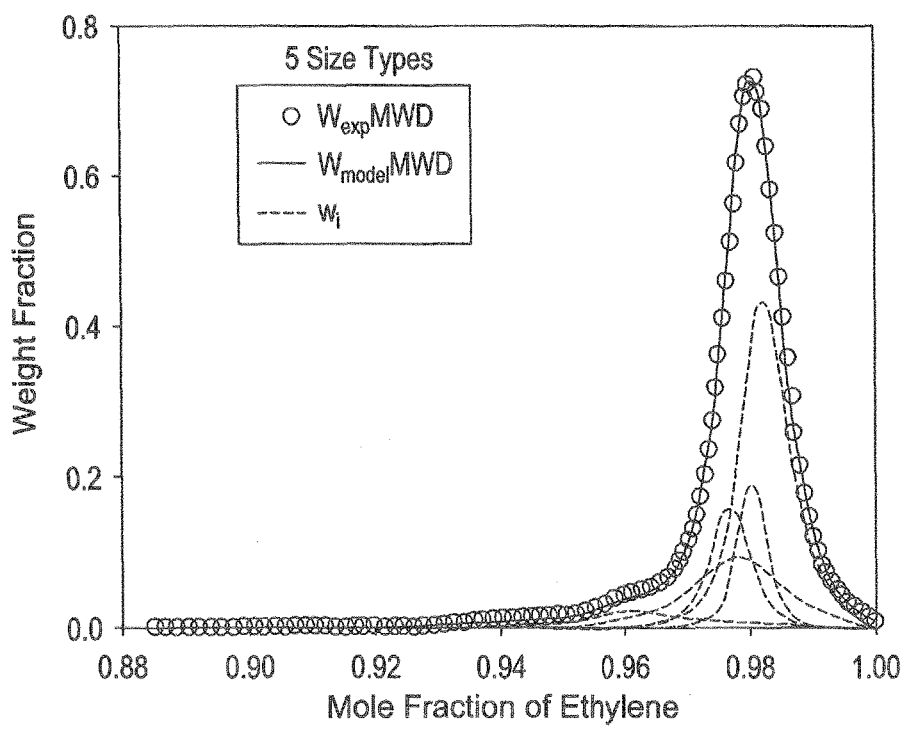
FIG. 7B depicts a model predicted Schulz-Flory and Stockmayer Copolymer Composition Distribution (CCD) of copolymer 2 with catalyst 2 active site types.

For copolymer 2, FIGS. 7A and 7B and Table 6 demonstrate the analogous model-predicted results.

TABLE 6

Catalyst site types and the estimated Schulz-Flory and Stockmayer model parameters for Catalyst 2

| Model Parameters | Active Catalyst Site types | | | | |
|---|---|---|---|---|---|
| | 1 | 2 | 3 | 4 | 5 |
| Predicted active catalyst types | | | 5 | | |
| $\chi^2 \times 10^3$ | 4.96 | | | | |
| $m_i$ | 0.0792 | 0.1820 | 0.4698 | 0.1422 | 0.1269 |
| $M_{ni}$ (g mol$^{-1}$) | 5028 | 13 661 | 32 266 | 69 007 | 106 663 |
| Ii (number of C$_2$H$_4$ repeat units) | 180 | 488 | 1 152 | 2 464 | 3 809 |
| $\overline{F}_1{}^a$ | 0.9568 | 0.9778 | 0.9823 | 0.9765 | 0.9801 |
| $\beta_i$ | 0.0515 | 0.0542 | 0.0374 | 0.0540 | 0.0475 |
| $\tau_i \times 10^3$ | 0.0056 | 0.0020 | 0.0009 | 0.0004 | 0.0003 |
| Activity per site type (×10$^3$ kg PE (g cat)$^{-1}$ h$^{-1}$) | 21.384 | 49.14 | 126.846 | 38.394 | 34.263 |

$^a$Mole fraction of ethylene in the copolymer

The following observations are common. For both copolymers, the model-predicted MWD and CCD match very well the corresponding experimental distributions. In each catalyst having particularly low Al:Zr ratios (62 and 68), five active site types are predicted. This finding is supported by the SSA thermal fractionation results that show five melting peaks, as shown in FIGS. 5A and 5B. Note that this melting peak number differs from the number of annealing steps used (seven) in the SSA experiment.

As per the above model prediction and SSA result, the modification of silica by ″BuSnCl$_3$ does not change the number of active site types. Each SSA peak melting point represents a defined population of copolymer backbones (with nearly the same short-chain branching), which can be correlated to the corresponding simulated Schulz-Flory and Stockmayer catalyst site types. Therefore, the implemented simultaneous deconvolution strategy is very effective for identifying the number of active site types for both copolymers with varying microstructures. Note that the active site types have been numbered in increasing order of the number-average molecular weight of the Schulz-Flory and Stockmayer components. The active center types differ from one another with respect to the simulated average molecular weight and co-monomer composition.

According to the already mentioned model predictions and SSA results, the modification of the silica surface by ″BuSnCl$_3$ did not change the number of active site types. Each SSA peak melting temperature represents copolymer backbones with same side-chain branching (SCB)/chain imperfection, but different mass fractions (see Table 6 and FIG. 10). The SCB was calculated using the correlation available in the literature ($T_{pm}=-1.69 \times SCB+133$) and the related mass fraction applying the J-integral DSC data. Considering the drop in SSA $T_{pm}$ and $M_{ni}$ values in each copolymer (due to the incorporation of 1-hexene, which works as a chain-transfer agent) with respect to the corresponding homopolymer, the SSA $T_{pm}$ values were correlated to the related Schulz-Flory and Stockmayer catalyst site types (Table 7).

TABLE 7

Effect of SSA DSC-Fractionated Peak Melting Temperatures on Side-Chain Branching and Lamellar Thickness

| Copolymer 1 | | | Copolymer 2 | | |
|---|---|---|---|---|---|
| Peak melting temperature (° C.) | SCB | Lamellar thickness (nm) | Peak melting temperature (° C.) | SCB | Lamellar thickness (nm) |
| 123.0 (CST 1) | 5.92 | 13.56 | 123.0 (CST 1) | 5.92 | 13.56 |
| 117.5 (CST 2) | 9.17 | 10.52 | 117.5 (CST 2) | 9.17 | 10.52 |
| 114.0 (CST 3) | 11.24 | 9.20 | 113.5 (CST 3) | 11.54 | 9.04 |
| 109.5 (CST 4) | 13.91 | 7.92 | 109.0 (CST 4) | 14.20 | 7.81 |
| 105.0 (CST 5) | 16.57 | 6.96 | 104.5 (CST 5) | 16.86 | 6.67 |

The predicted five active catalyst site types in both catalysts can be attributed as follows. Based on published reports, it is speculated that the experimental MAO consists of a mixture of five different three-dimensional cage structures that feature the following. (i) Each MAO structure comprises n methylaluminoxane —(AlOMe)$_n$-repeat units. The proposed five MAO structures can be denoted by five different values of n. (ii) Each of the five proposed MAO structures has preferably one type of defined strong active Lewis acid catalyst site that can be ascribed to the —AlO$_2$Me— environment. This is stated based on an electron paramagnetic resonance (EPR) spin-probe study of Lewis acid sites of MAO reported by Talsi et al., "The metallocene/methylaluminoxane catalysts formation: EPR spin probe study of Lewis acidic sites of methylaluminoxane," J. Mol. Catal. A: Chem, 1999, 139, 131-137. Accordingly, five different active ion pairs $[Zr]^+[MAO_{supported}]_n^-$ to prevail in each supported catalyst.

Figure 15:
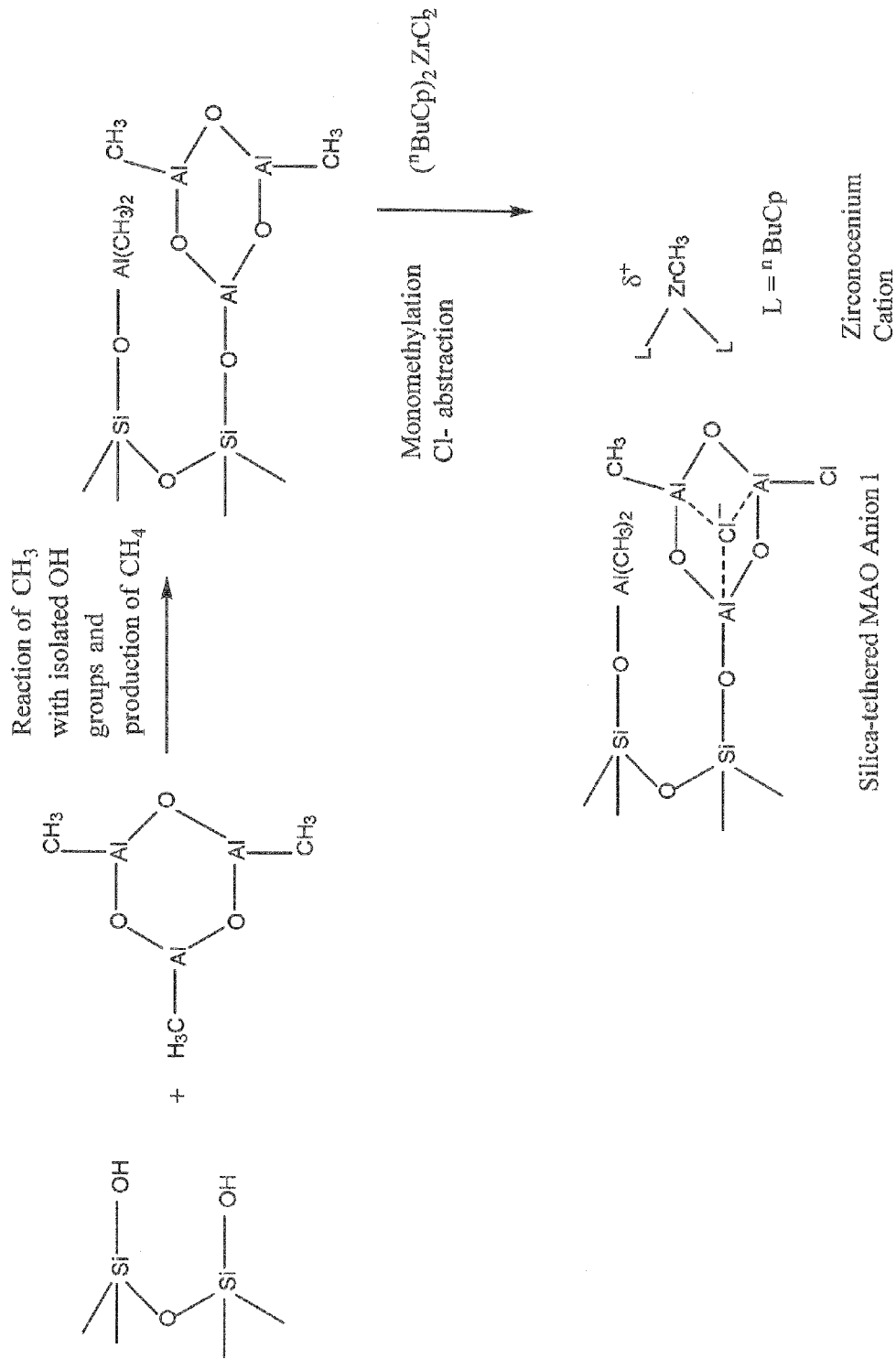
FIG. 15 is a reaction scheme showing formation of a supported metallocene catalyst for olefin polymerization (Catalyst 1) according to the present invention.

Using the relevant published characterization results and reports, we propose the catalyst surface chemistry as follows. During the synthesis of Catalyst 1, the isolated —OH Brönsted acid group of silica simultaneously reacts with the labile basic bridging methyl group (—CH$_3$) of MAO, as well as with the free and associated trimethyl aluminum (TMA, having the formula Al(CH$_3$)$_3$) contained therein. Both reactions produce methane (CH$_4$). The first reaction tethers MAO to silica, while the second one passivates it, as shown in FIG. 15.

Figure 16:
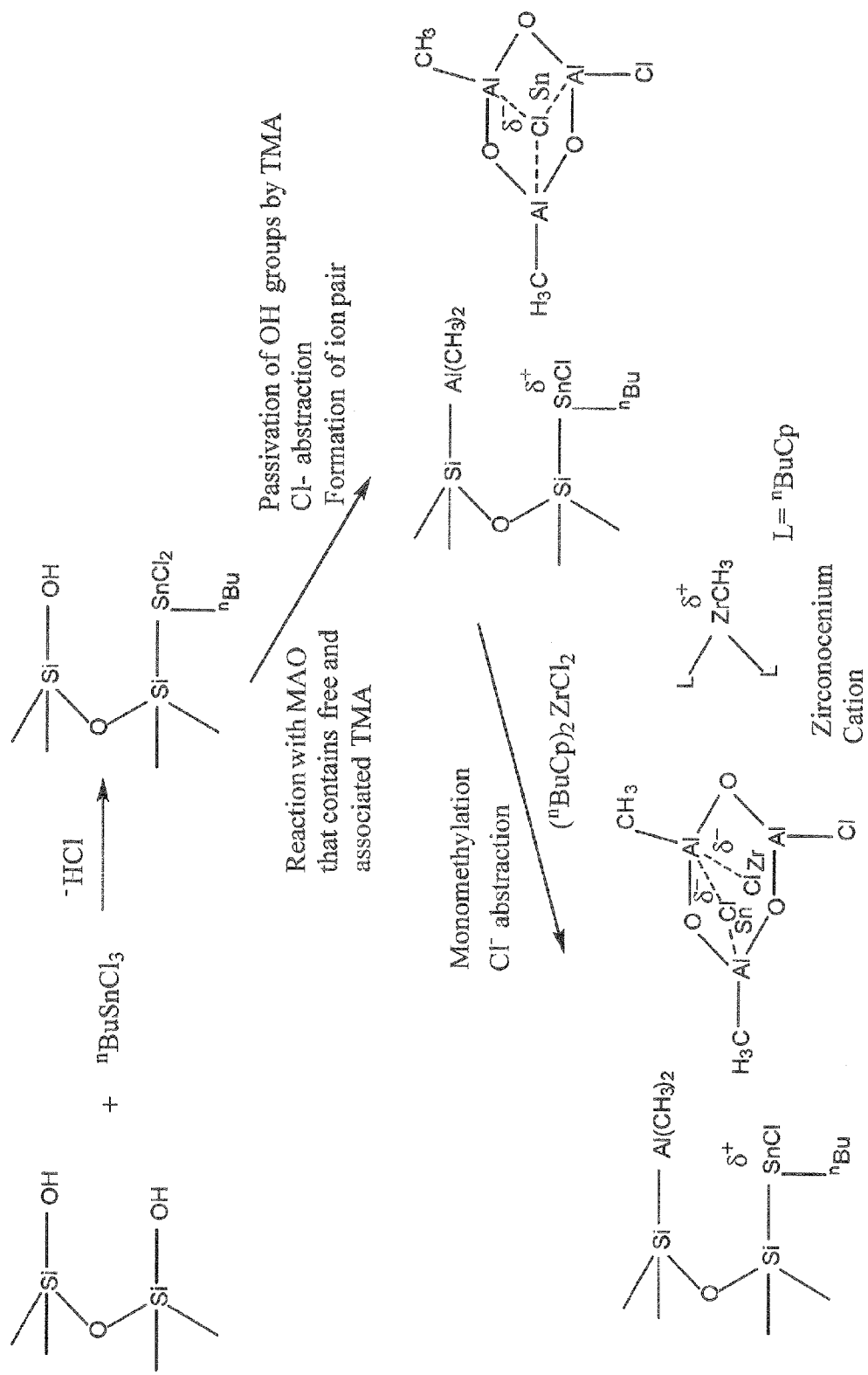
FIG. 16 is a reaction scheme showing formation of a catalyst for olefin polymerization (Catalyst 2) formed by modifying the silica support with tin chloride prior to tethering MAO to the silica.

MAO does not have an unambiguous structure. However, the proposed three-dimensional cage structures (having the general formula (—CH3—O—Al—)$_n$, where n=n$_1$, n$_2$, ..., n$_5$) characterized with the following are most widely accepted: structural similarity with poly(tert-butylaluminoxane) cages, hexagonal (six-membered ring) faces, and four-coordinate Al and three-coordinate O centers (comprising Al—O and Al-Me bonds). For Catalyst 2 (as shown in FIG. 16), particularly during functionalization of silica, the isolated —OH Brønsted acid group reacts with the chloride ligand (—Cl) of ″BuSnCl$_3$, generating HCl that gets stripped during drying of the synthesized catalyst under very high vacuum. The resulting modified silica (Si—O—″BuSnCl$_2$) next contacts MAO. Here, the [Si—O—″BuSnCl]$^{\delta+}$, [MAOCl]$^{\delta-}$ ion pair is postulated to form through chloride abstraction by the partial consumption of the strong aluminum Lewis acidic site of MAO. Thus, ″BuSnCl$_3$ modifies silica as well as MAO.

Consequently, the overall Lewis acid strength of Catalyst 2 partially decreases. The lower polymerization activity of Catalyst 2, incidentally, supports this remark. The literature reports that the MAO Lewis acid site originates from the coordinatively unsaturated Al in an —AlO$_2$Me— menvironment (which consists of the tri-coordinated Al atoms bridging the tri-coordinated oxygen atoms).

During impregnation of (″BuCp)$_2$ZrCl$_2$ on SiO$_2$/MAO (Catalyst 1) and SiO$_2$—nBuSnCl$_3$/MAO (Catalyst 2), the following two reactions occur. First, the methyl groups of the silica-supported MAOs monomethylate a chloride ligand (—Cl) of (″BuCp)$_2$ZrCl$_2$. Then, another one is abstracted by the strong aluminum Lewis acidic site of MAO. The Cl-ligand-exchanged methyl group in (″BuCp)$_2$ZrCl$_2$ remains intact. Consequently, the corresponding solid-state electrostatic ion pairs (which are the active catalyst centers) are generated, as shown in FIGS. 15 and 16. Note that the conversion of (″BuCp)$_2$ZrCl$_2$ to (nBuCp)$_2$ZrMe$_2$ by MAO (through complete ligand exchange between Cl and Me) is not supported by UV-visible spectroscopy and $^1$H NMR and $^{13}$C NMR spectroscopy.

The deconvolution of MWD and CCD independently evidences five active catalyst site types in both Catalyst 1 and Catalyst 2, which match the live SSA DSC peaks of each copolymer. The significance of this correlation has already been detailed earlier. The consistency in the catalyst active site types can be explained as follows. Based on published reports, we assume that the experimental MAO probably consists of a mixture of five different cage structures that feature the following.

Each MAO structure comprises n MAO —(AlOMe)$_n$-repeat units. The proposed five MAO structures are denoted by five different values of n. Note that the MAO cage structural distribution is an integral component of the MAO synthesis process.

Each of the five MAO structures has preferably one type of strong Lewis acid catalyst site that can be ascribed to the $AlO_2Me$-environment. We state this based on the electron paramagnetic resonance spin probe study of Lewis acid sites of MAO reported by others. Accordingly, five different active $[Zr]^+[SMAO]_n^-$ ion pairs are likely to prevail in each supported catalyst (FIGS. 15 and 16).

In light of the catalyst active center distribution and surface chemistry, we now address copolymerization behavior.

Table 1 shows that Catalyst 1 ethylene homo- and copolymerization activities are greater than those of Catalyst 2. We explain this result using the fundamental concept of ion-pair separation, which is well documented in the literature. According to this concept, the tighter is the ion-pair separation, the higher is the energy barrier associated with each polymerization step; hence, the activity is lower.

Figure 17:
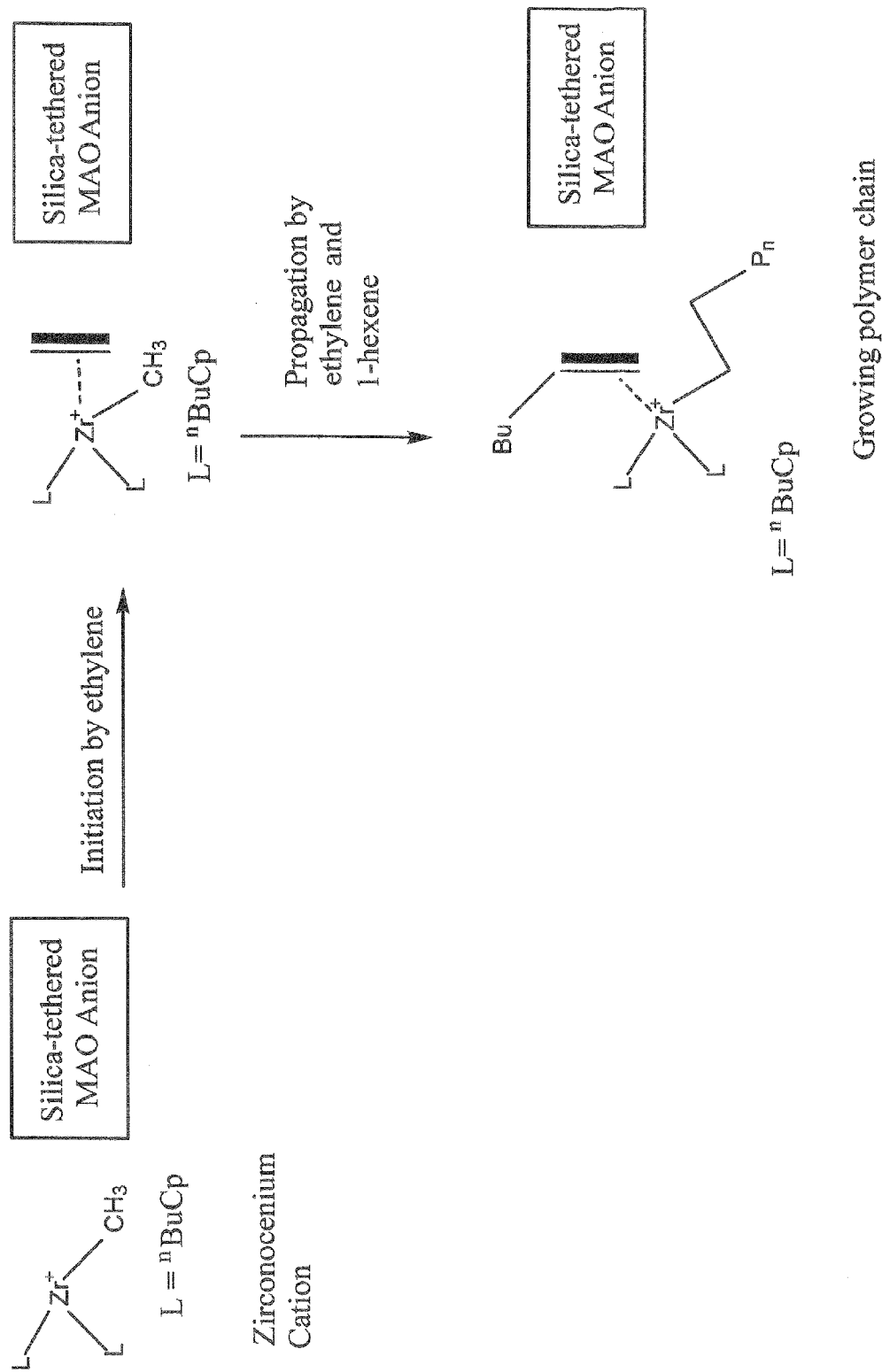
FIG. 17 is a reaction scheme showing use of the catalyst of FIG. 15 for copolymerization of ethylene and 1-hexene.
Figure 18:
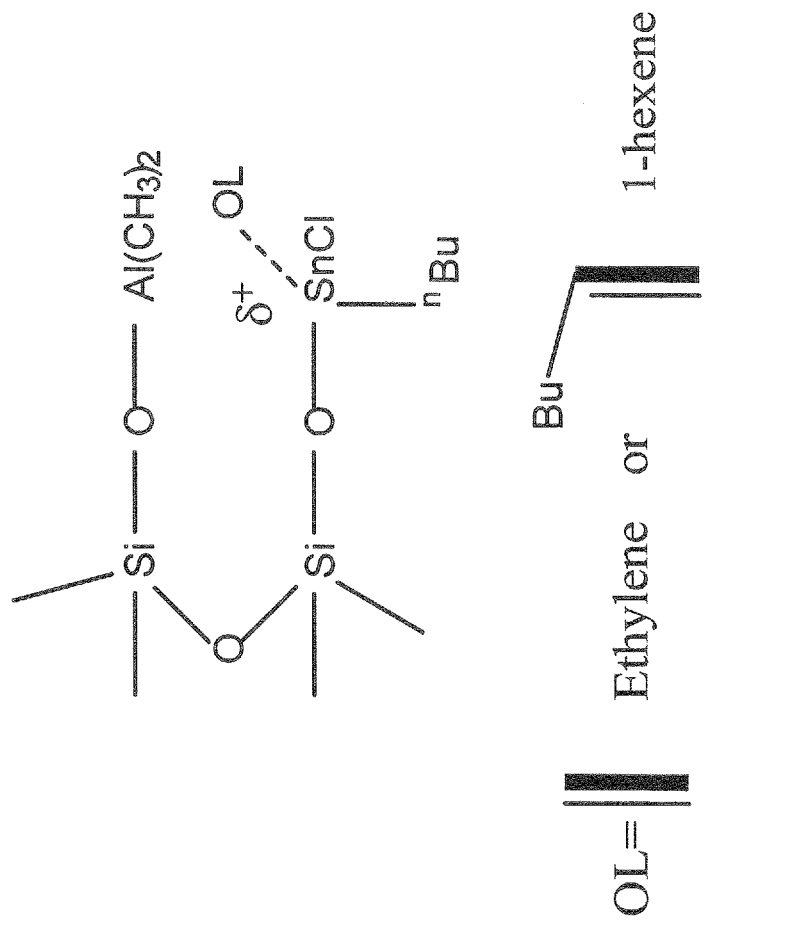
FIG. 18 is a diagram showing propagation of a copolymer of ethylene and 1-hexene using the catalyst of FIG. 16 (Catalyst 2).

By introducing "BuSnCl_3, we essentially engineer the Catalyst 1 $[MAOCl]^-$ anions, which introduce steric and electronic effects, and a priori consume partially the MAO strong Lewis acid Al sites (already stated earlier). This impairs the $Cl^-$ ligand abstraction from "BuSnCl_3 (compare FIG. 16 (Catalyst 2) with FIG. 15 (Catalyst 1)). Consequently, the resulting anionic negative charge in Catalyst 2 is less delocalized, producing tighter cation-anion pairs (corresponding to each active catalyst site type), and the $Zr^+$ metal center becomes less electrophilic. These steric and electronic effects increase the ion-pair tightness (polymerization energy barrier) in Catalyst 2. Additionally, ethylene and 1-hexene are likely to coordinate with Si—O—"BuSnCl, acting as a Lewis base ligand. This will further add to the bulkiness of the MAO anion, and decrease the concentration of in-coming monomer(s) toward the zirconocenium cation (FIG. 16). The tightness of the cation-anion pairs will restrict the access of the bulkier 1-hexene to the Zr+ metal center. Therefore, the activity of Catalyst 2 ion pairs towards ethylene and 1-hexene decreases, which eventually reduces the rates of monomer insertion and polymer chain growth, and hence the overall catalyst activity (see FIGS. 17 and 18).

Thus, the above proposal, based on the concept of ion-pair separation, explains the observed lower copolymerization activity of Catalyst 2.

Figure 8:
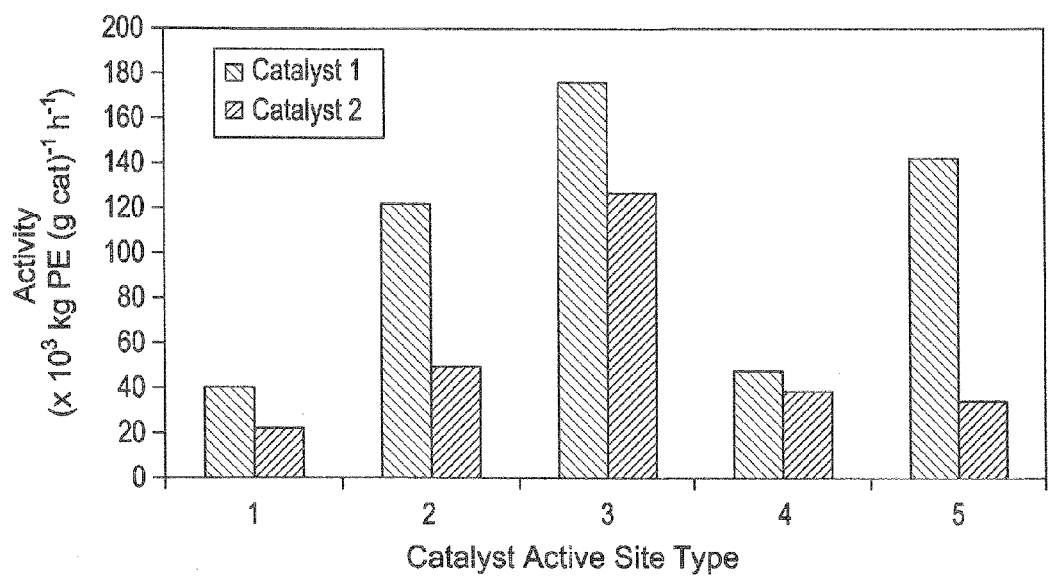
FIG. 8 is a chart showing the contribution of Catalyst 1 and Catalyst 2 Schulz-Flory and Stockmayer active site types to the corresponding overall ethylene-1-hexene copolymerization activities.
Figure 9:
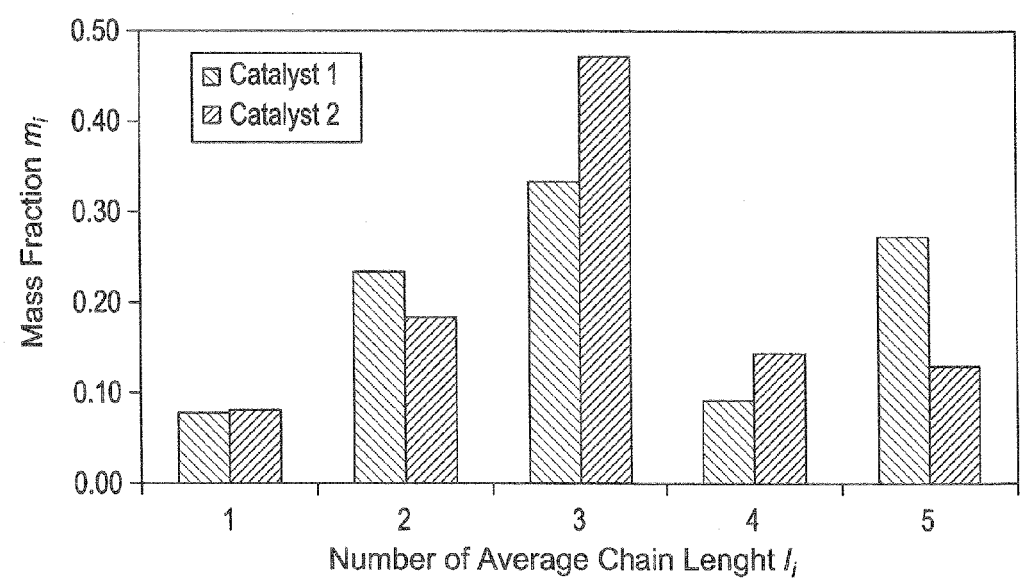
FIG. 9 is a chart showing the effects of catalyst 1 and catalyst 2 Schulz-Flory and Stockmayer active site types on the model-predicted discrete number-average chain length distribution of Copolymer 1 and Copolymer 2, respectively.

FIG. 8 illustrates the contribution of Catalyst 1 and Catalyst 2 Schulz-Flory and Stockmayer active site types to the corresponding copolymerization activities. The activity of each active site type of Catalyst 2 is less than that of Catalyst 1, which has already been explained above. For a given catalyst, the variance in site type activity can be attributed to the corresponding surface chemistry and coordination environment, which, to the best of our knowledge, has not been reported before. We calculated the site type by multiplying the overall catalyst activity with the mass fraction $m_i$ (Tables 5 and 6) of the polymer produced using a Schulz-Flory and Stockmayer catalyst site type. Therefore, FIG. 8 offers a theoretical microscopic assessment of the overall copolymerization activity of each supported catalyst. Similar effect of variance in catalyst site type activity and coordination environment is also reflected by the discrete number-average chain length distribution, as shown in FIG. 9.

Because of the simultaneous presence of the five different active catalyst site types, the copolymerization involving both Catalyst 1 and Catalyst 2 is subject to a large number of polymerization initiation, propagation and chain termination reactions. This converts the experimental copolymerization into an epitome of multiple series-parallel reactions having varying rates. FIG. 8 is a selected overall representation of such phenomena. Consequently, the overall system will deviate from molecular-scale perfect mixing and become sensitive to the segregation effect. This is why each copolymer shows compositional heterogeneity. According to the literature, it is the CCD that, unlike the average copolymer composition, is sensitive to the segregation effect. Therefore, CCD is used to measure this (FIGS. 4, 5A, and 5B). Note that our explanation differs from what has been proposed in this context in previous literature. This is more elaborate and fundamental, and is supported by catalyst active center distribution modeling and SSA experiments.

Table 2 shows that the introduction of 1-hexene greatly lowers the weight-average molecular weight of both Copolymer 1 and Copolymer 2. The copolymer molecular weights, compared to those of the homopolymers, decrease by 55.34 and 78.30%, respectively. Therefore, all five active sites in each catalyst actively respond to 1-hexene, which acts as a strong chain-transfer agent. This happens in addition to incorporation of 1-hexene along the growing polyethylene chain (see FIGS. 17, 18). Consequently, the molecular weights decrease. We measured the end-group unsaturation using FTIR spectroscopy. Both copolymers show the presence of vinyl, vinylidene and trans-vinylene unsaturation. Hence, the growing copolymer chains are terminated following the three simultaneous chain-transfer reactions—routes A, B and C—shown in FIGS. 19A, 19B, and 19C.

In FIG. 19A, the mechanism shows Route A: 1,2-insertion of 1-hexene and generation of vinylidene terminus $(CH_2=CR_1R_2; R_1 \neq R_2)$ (through $\beta$-hydrogen elimination to $Zr^+$ active sites).

In FIG. 19B, the mechanism shows Route B: $\beta$-hydrogen transfer to 1-hexene and generation of a vinyl terminus $(CH_2=CHR)$.

In FIG. 19C, the mechanism shows Route C: 2,1-misinsertion of 1-hexene, followed by $\beta$-hydrogen elimination to the $Zr^+$ active sites with generation of a trans-vinyl terminus $(R_1CH=CHR_2; R_1 \neq R_2)$.

The polymerization activity of each catalyst independently increases upon the addition of 1-hexene. Therefore, they both show positive 1-hexene co-monomer effect. This finding (irreversible enhancement of catalyst activity), with reference to ethylene-1-hexene copolymerization, has been widely reported in the literature. The following two explanations for the combination of both have been mostly proposed: Fink's filter effect (a physical mass transport or diffusion-limited process) and activation of the dormant/sleeping catalytic sites.

According to Fink's filter effect, the active sites of a supported catalyst get coated by a polyethylene inner shell and an ethylene-1-hexene copolymer outer shell because of the difference in monomer molecular size and diffusivity. This is the microscopic view of a typical ethylene-1-hexene copolymer whose overall crystallinity is usually much less than that of the ethylene homopolymer. This increases 1-hexene diffusivity, which enhances the catalyst polymerization activity. However, there are several drawbacks of this explanation, which we summarize below.

Copolymerization of ethylene with 1-hexene using unsupported metallocenes is well documented in the literature. Positive co-monomer effect has been noticed under such a situation when the catalyst is soluble but the polymer formed is insoluble in the polymerization medium. This shows that copolymerization rate enhancement occurs even without Fink's filter effect. Moreover, positive to negative co-monomer effects prevail with the increasing concentration of 1-hexene co-monomer. The filter effect does not well accommodate this transitional behavior. Additionally, it does not align with the chain transfer role of 1-hexene that significantly decreases the molecular weight with the generation of different vinyl unsaturation in the copolymer backbone (FIGS. 19A-19C). Hence, Fink's filter effect turns out to be less convincing.

On the other hand, the activation of the dormant/sleeping catalytic sites, unlike the filter effect, is an intrinsic chemical phenomenon. In this context, the activation of the dormant/sleeping $Zr^+$—H catalytic sites by 1-hexene is to be particularly considered. Note that these $Zr^+$—H sites originate through routes A and B (FIGS. 19A and 19B). Based on the modeling of active center distribution and SSA experiments, the mechanism of copolymerization of ethylene with 1-hexene with respect to $Zr^+$—$CH_3$ and $Zr^+$—H appears to be similar. The activity corresponding to each Schulz-Flory and Stockmayer component equals the intrinsic activity due to $Zr^+$—$CH_3$ and $Zr^+$—H. The combination of $Zr^+$—$CH_3$ and $Zr^+$—H is considered to be a single active center family. However, in the first case, the initiation starts with the insertion of ethylene, whereas in the latter case, it begins with 1-hexene. Consequently, the less substituted carbon is bonded to $Zr^+$ as illustrated in FIG. 20. Note that the β-hydrogen elimination is the reverse of 1-hexene insertion into the $Zr^+$—H bond.

The effects of the supported catalyst type on the copolymer intrachain microstructure and the related copolymerization mechanism are discussed. The copolymer microstructure is defined in terms of the triad mole fractions and the associated microstructural parameters, as well as the theoretical ethylene sequence length distribution and its most probable value, $\eta_{E\ MPNMR\text{-}Flory}$ (peak of the distribution).

Table 3 reports that the contents of HEH and HHH in both copolymers are zero. The literature supports this finding. The remaining triad mole fractions of copolymer 1 differ from those of copolymer 2. Table 4 compares the microstructural parameters of the two copolymers. The following observations can be made.—(i) For type A, the average 1-hexene sequence length $\eta_{H\ NMR}$ persistence ratio ρ, random parameter $\chi_R$, $\Omega_E$ value, first-order Markovian reactivity ratio product $r_E r_H$, and average experimental reactivity ratio product $(r_E r_H)$ of copolymer 1 and copolymer 2 are mutually comparable. (ii) For type B, the run number of copolymer 1 is greater than that of copolymer 2. (iii) For type C, the average ethylene sequence length, $\eta_{E\ NMR}$, and cluster index of copolymer 1 are less than those of copolymer 2.

From the preceding analysis, it can be remarked that the catalyst active-site distribution and the variance in the design of the supported MAO anion, characterized by different electronic and steric effects (due to "$BuSnCl_3$) and coordination environments, affected the copolymer microstructural parameters of only types B and C. The eventual consequences of this finding on thermal behaviors are discussed in the following.

Now, the reactivity ratios of ethylene ($r_E$) and 1-hexene ($r_H$) and their product ($<r_E r_H>$) for both catalysts and copolymers are addressed. For catalyst 1 (copolymer 1), $r_E$=76.928, and $r_H$=0.054, whereas for catalyst 1 (copolymer 2), $r_E$=162.256, and $r_H$=0.043. $r_E$ and $r_H$ are defined by $r_E=k_{EE}/k_{EH}$ and $r_H=k_{HH}/k_{HE}$, where $k_{EE}$ and $k_{HH}$ are the ethylene and 1-hexene terminal model homopropagation rate constants, respectively, and $k_{EH}$ and $k_{HE}$ are the cross-propagation rate constants. Therefore, $r_E$ and $r_H$ indicate the activities of the catalyst toward insertion of ethylene and 1-hexene, respectively. One can note that $r_{E|catalyst\ 2}/r_{E|catalyst\ 1}$=2:1 and $r_{H|catalyst\ 2}/r_{E|catalyst\ 1}$=0.8:1. Hence, copolymer 2 has a longer ethylene sequence, $r_{E\ NMR}$ than copolymer 1 (see Table 4). The variance in $r_E$ and $r_H$ in copolymer 1 and copolymer 2 results from the difference in catalyst surface chemistry (electronic versus steric effects) of the active-site types and coordination environments. Next, $(r_E r_H)$ is addressed.

In the literature, based on experimental data ethylene-α-olefin copolymers have been classified as follows: (i) $(r_E r_{\alpha\text{-}olefin})$=1, random; (ii) $(r_E r_{\alpha\text{-}olefin})$=0.2-1.0, slightly alternating to random; (iii) $(r_E r_{\alpha\text{-}olefin})$=0.005-0.01, highly alternating; and (iv)) $(r_E r_{\alpha\text{-}olefin})$=2.0-4.0, blocky character. For ethylene-1-hexene copolymers, $(r_E r_H)$ was independently calculated using the published triad mole fractions, and the results were compiled. It can be noted that unsupported metallocenes mostly synthesize slightly alternating to approximately random ethylene-1-hexene copolymers ($<r_E r_H>$=0.186-1.300) according to the first-order Markovian statistical/terminal copolymerization model. However, we observed that catalyst 1 and catalyst 2 synthesized copolymer 1 with $(r_E r_H)\cong 4$ and copolymer 2 with $(r_E r_H)\cong 7$, respectively. The corresponding random parameter $\chi_R$ equals 0.91 (see Table 4). In the literature, either $<r_E r_H>$, $(r_E r_{H\ first\text{-}order\ Markov})$ or $\chi_R$ has been used to identify the copolymer type. However, these are lumped kinetic parameters. Hence, it can be proposed that the modeled (theoretical) ethylene sequence length distribution of the experimental copolymer should also be compared against that of the corresponding ideal random copolymer having $(r_E r_H)$=1. See FIG. 11, which shows the extent to which copolymer 1 and copolymer 2, from a distributive perspective, differ from the corresponding perfectly random analogs. Based on the three mentioned criteria (($r_E r_H$), $\chi_R$, and the FIG. 11 prediction), it is concluded that catalyst 1 and catalyst 2 synthesized fairly random copolymers with minor skewedness toward blocky character ([EHH]=0.004 and 0.010, Table 3). This random feature enabled us to thermally fractionate the copolymers using the SSA DSC technique (see FIG. 5).

Now, the heterogeneous copolymerization mechanism is addressed. Table 4 shows that $<r_E r_H>$ for each copolymer matches the corresponding first-order Markovian value. Hence, both supported catalysts copolymerized ethylene with 1-hexene following the terminal statistical copolymerization mechanism. The fact that $\Omega\cong 1$ additionally supports this conclusion. The catalyst active-center distribution and the variant design of the supported MAO anion did not affect this kinetic feature. However, $r_E r_{H|first\text{-}order\ Markov}$ or $(r_E r_H)$ >>1 (significant deviation from unity) has important catalytic implications. This means that both catalyst 1 and catalyst 2 have multiple active catalyst sites. Therefore, the microstructural characterization of the synthesized copolymers by $^{13}C$ NMR spectroscopy further supported the deconvolution model predictions and the SSA DSC experimental results that were already reported earlier.

Figure 11:
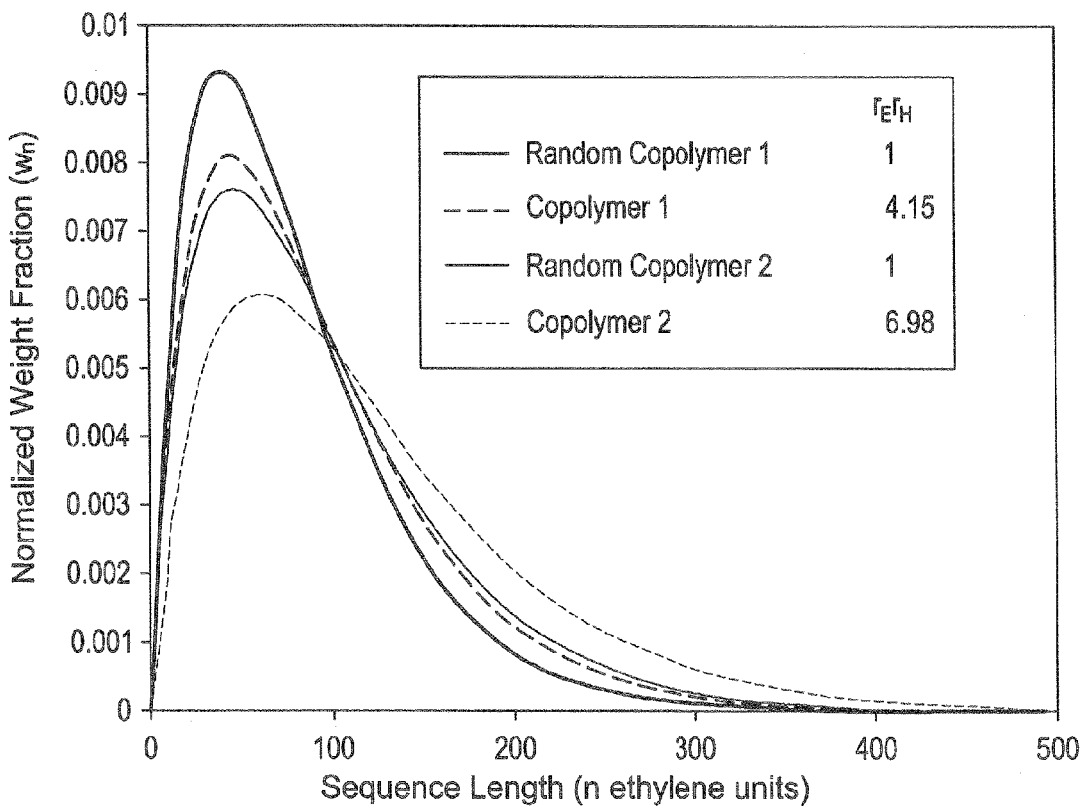
FIG. 11 is a graph showing a comparison of theoretical ethylene sequence (equilibrium crystal) length distributions of copolymer 1 and copolymer 2, calculated using the Flory model.

FIG. 11 shows that the theoretical ethylene sequence length distribution (SLD) of copolymer 1 significantly differed from that of copolymer 2. Therefore, SLD, similarly to MWD and CCD, can also be used to reflect the effects of the supported catalyst active-site distribution and the variance in the design of the supported MAO anion (having different electronic and steric effects and coordination environments) on the copolymer backbone heterogeneity.

The copolymer thermal behaviors in terms of peak melting and crystallization temperatures ($T_{pm}$ and $T_{pc}$), percentage crystallinity, SSA-induced fractionation temperatures (multiple alternate melting and crystallization behavior), and lamellar thickness distribution (LTD) were considered. These properties are discussed from the viewpoint of the copolymer composition distribution (CCD), intrachain microstructure heterogeneity [monomer sequence distributions (that is, defect concentration and its distribution) and the associated micro-structural parameters], and theoretical ethylene sequence (equilibrium crystal) length distribution and its most probable value, all of which are dictated by catalyst type.

In both copolymers, the incorporation of 1-hexene, with reference to the corresponding homopolymers, decreased the peak melting and crystallization temperatures ($T_{pm}$ and $T_{pc}$), as well as the percentage crystallinity (see Table 2). This behavior is attributed to the structural/enchainment defect (shown in FIGS. 5A-6B) and the eventual partial disruption of the crystal package of the polyethylene chains that resulted from (i) the incorporation of 1-hexene; (ii) the monomer sequence distributions, the effect of which is quantified by the average ethylene sequence length $n_{E\ NMR}$, cluster index, and run number, all of which are determined by $^{13}$C NMR spectroscopy; and (iii) the theoretical ethylene sequence (equilibrium crystal) length distribution (see FIG. 11; calculated using the Flory model), the influence of which is assessed by its most probable ethylene sequence $\eta_{E\ MPNMR-Flory}$.

Copolymer 2 showed a higher percentage crystallinity than copolymer 1 (52.94% versus 43.69%). This can be correlated with the higher average ethylene sequence length $\eta_{E\ NMR}$, cluster index, and most probable ethylene sequence $\eta_{E\ MPNMR-Flory}$ of copolymer 2 relative to copolymer 1. The opposite relation holds for run number. Therefore, these particular microstructural parameters can be grouped to evaluate the intrinsic crystallizability of the ethylene-1-hexene copolymer backbones. These parameters originate statistically from the concerned addition copolymerization. Physically, this means that, in copolymer 2,1-hexene shortened the average ethylene sequence length less. Consequently, the chains, on average, were less frequently interrupted from folding than copolymer 1. The depression in peak melting temperature [$\Delta T_{pm} = T_{pm}1_{homopolymer} - T_{pm}1_{copolymer})$] and peak crystallization temperature [$\Delta T_{pc} = T_{pc}1_{homopolymer} - T_{pc}1_{copolymer})$] appeared to be inversely related to ethylene sequence length $n_{E\ NMR}$, cluster index, and most probable ethylene sequence $\eta_{E\ MPNMR-Flory}$.

Figure 12:
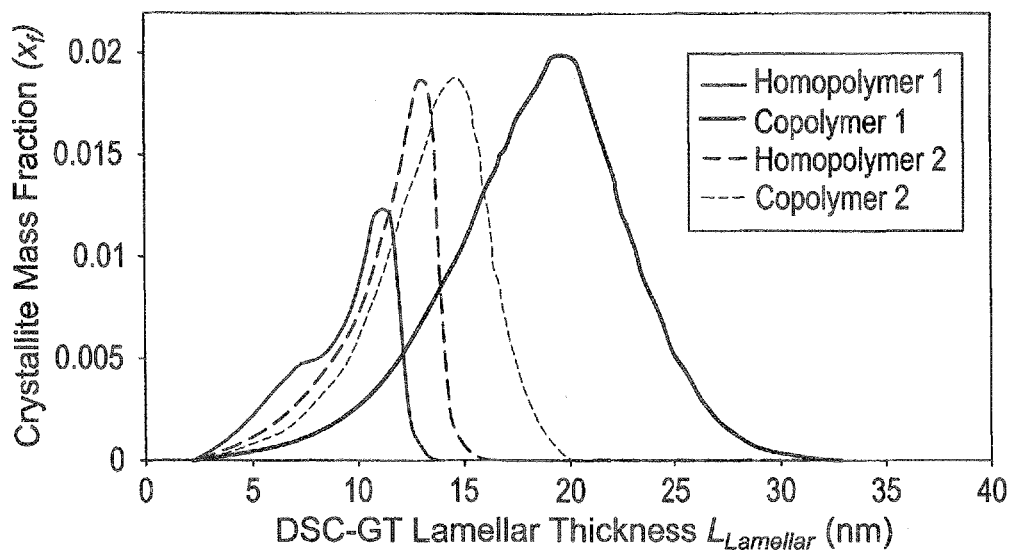
FIG. 12 is a graph showing a comparison of lamellar thickness distributions of homopolymer 1, copolymer 1, homopolymer 2, and copolymer 2, calculated using the Gibbs-Thompson equation and conventional Differential Scanning Calorimetry (DSC).

Crystallization was discussed earlier from the perspective of microstructural parameters, determined using $^{13}$C NMR spectroscopy. Now, this subject is addressed in terms of melting properties, such as lamellar thickness distribution and the corresponding most probable and average values, determined using DSC. FIG. 9 mutually compares the lamellar thickness distributions of homopolymer 1, copolymer 1, homopolymer 2, and copolymer 2, which were calculated using expressions available in the literature and the DSC data, as well as the corresponding most probable lamellar thickness LMPDSC-GT from the peak of each distribution. In this calculation, $T°_m = 145.5°$ C., $\Delta H$ of=290 J cm$^{-3}$, and $\sigma_{ssfe}$=90 mJ m$^{-2}$ were used. They have been reported in the literature to be the best values to be used. However, $T°_{m,\ Copolym}$ was estimated as described in the literature. $L_{MPDSC-GT}$ was next converted into the most probable ethylene sequence $\eta_{E\ MPDSC-GT}$ by dividing it by the length of an ethylene repeat unit (0.254 nm). We summarize below the findings of FIG. 12 as follows.

First, $L_{MPDSC-GT}$ decreased in the order homopolymer 1>homopolymer 2>copolymer 2>copolymer 1 (see Table 2). Note that homopolymer 1 and homopolymer 2 have neither interchain composition distribution nor intrachain microstructural heterogeneity. On the other hand, copolymer 2 and copolymer 1 have such differences, which influenced the corresponding $L_{MPDSC-GT}$ values. This is another reflection of the effect of the supported catalyst active-site distribution and the variance in the design of the supported MAO anion on polyethylene melting behavior.

Second, $\eta_{E\ MPDSC-GT}$ for each copolymer compared very well with the corresponding value of $\eta_{E\ MPNMR-Flory}$ that we calculated using the Flory model and $^{13}$C NMR spectroscopy (see Table 4). To the best of our knowledge, such a match has not previously been reported in the literature.

Third, $\Delta T_{pm}$ and $\Delta T_{pc}$ appeared to be inversely correlated with the most probable lamellar thickness $L_{MPDSC-GT}$ and the ethylene sequence length $\eta_{E\ MPDSC-GT}$.

Fourth, the DSC-GT lamellar thickness distributions of copolymer 1 and copolymer 2 resembled the corresponding CCDs (see FIG. 2).

Figure 13:
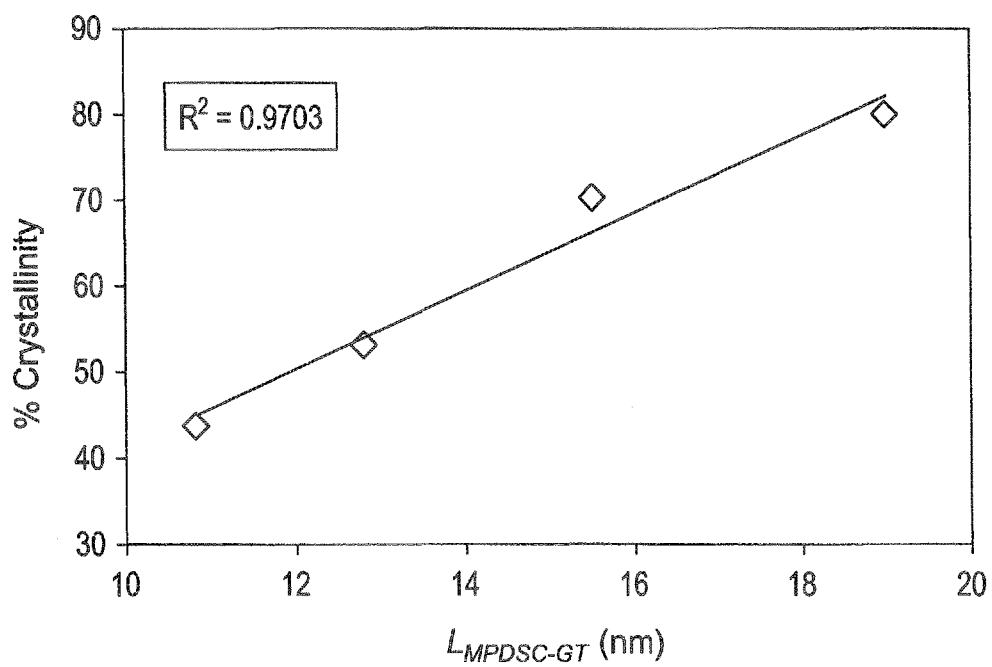
FIG. 13 is a graph showing the variation of percentage crystallinity as a function of the most probable lamellar thickness $L_{MPDSC-GT}$ calculated using the Gibbs-Thompson equation and conventional DSC.

FIG. 13 shows that the percentage crystallinity, inclusive of the homopolymers, increased linearly as a function of $L_{MPDSC-GT}$, which is directly related to $\eta_{E\ MPDSC-GT}$ and $\eta_{E\ MPNMR-Flory}$. This finding has important physical significance. This linear relation indicates that the homopolymers and copolymers undergo similar chain folding behaviors. The copolymer ethylene backbone sequences were subjected to an increase in repulsive energy generated between the backbone and the butyl branch (that results from the incorporation of 1-hexene). Consequently, the butyl branch is excluded from chain folding. This means that the structural/enchainment defect due to 1-hexene is excepted from the crystal lattice, forming a pure polyethylene phase. Note that the formation of such a phase influences the copolymer mechanical properties and various end-use properties. The literature supports this conclusion.

Now, the multiple alternate melting and crystallization behavior of copolymer 1 and copolymer 2 is discussed. Both copolymers showed similar successive self-nucleation and annealing (SSA) thermal fractionation results, that is, five distinct melting peaks (at 105.40, 109.76, 114.01, 117.71, and 123.00° C. for copolymer 1 and at 105.19, 109.56, 113.83, 117.73, and 123.30° C. for copolymer 2; see FIGS. 5A and 5B). These peak temperatures and the corresponding lamellar thicknesses (Table 6) are mutually comparable. Hence, the two copolymers have similar crystallizable lengths of PE sequences. However, their weight fractions differ (see FIG. 14). Unlike the copolymers, the homopolymers, being linear, did not demonstrate any multiplicity of melting peaks. Based on this finding and the exclusion of the butyl group from chain folding (see FIG. 10), one can remark that the SSA trace of each copolymer also indicates the structural defect resulting from 1-hexene-introduced butyl branches, which was, in essence, also measured using Crystaf. This provides a probable clue to why the number of active-site types, determined by the deconvolution of the Crystaf CCD, matches the number of SSA fractionation temperatures.

SSA DSC showed better resolution than Crystaf. This made the intra- and intercopolymer backbone heterogeneity comparable, although this was not clearly revealed by the Crystaf traces (monomodal versus bimodal). However, the corresponding homopolymer, in each case, consisted of fairly straight chain backbones. Each SSA peak signifies a population of backbones that have the same branch content [side-chain branching (SCB)], crystallinity, and lamellar thickness. SCB is inversely connected to the latter two, which are directly related. Therefore, the branch content decreased, and the lamellar thickness increased with increasing peak melting temperatures. The lamellar thickness was calculated using expressions reported in the literature. Table 7 lists these values. The SSA traces of ethylene-1-hexene copolymers, synthesized using supported metallocenes, such as $MgCl_2(THF)_2/MAO/Cp_2ZrCl_2/MAO$ and $SiO_2(MAO)/Me_2Si(Ind)_2ZrCl_2$, have been reported in the literature. They also showed multiple melting peaks. Hence, the literature supports our findings. Note that, in SSA fractionation, the polymer undergoes multiple alternate melting and crystallization processes (without physical separation of the chains) as the temperature decreases. Therefore, it is sensitive to linear and uninterrupted chain sequences, hence, to both intra- and inter-chain defects. Our $^{13}C$ NMR results, reported earlier, complement this remark.

Figure 14:
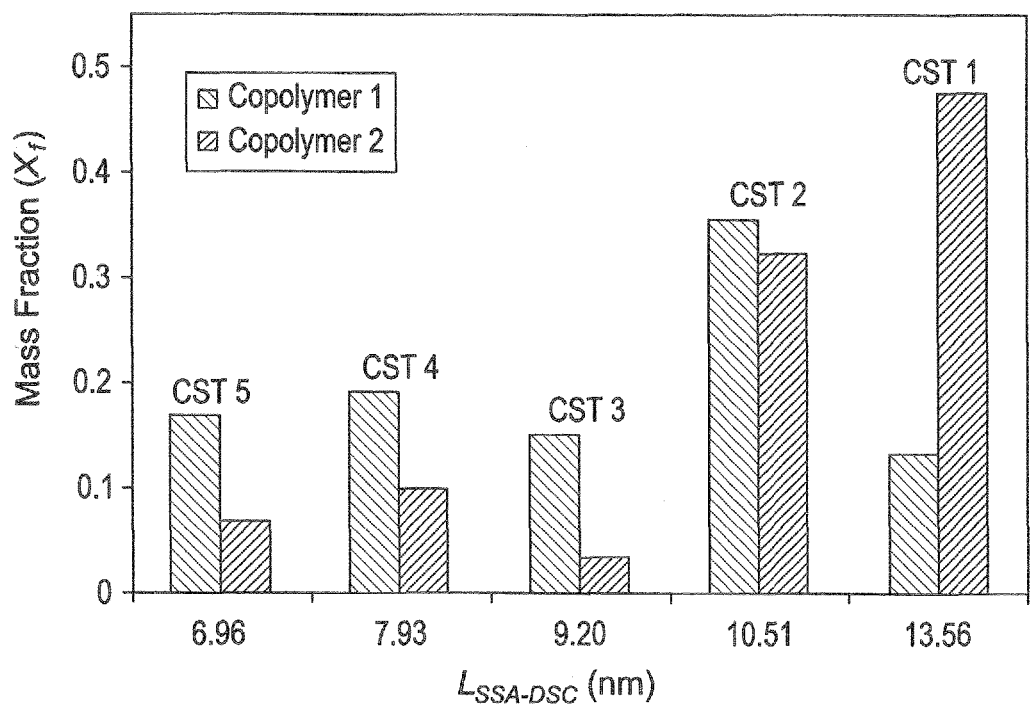
FIG. 14 is a chart showing a comparison of discrete lamellar thickness distributions of copolymer 1 and copolymer 2, determined using the SSA DSC technique, where CST=Schulz-Flory and Stockmayer catalyst site type.

FIG. 14 shows that the discrete SSA DSC lamellar thickness distribution of copolymer 1 significantly differs from that of copolymer 2. Because of the relationship between the SSA DSC peak melting temperature and the catalyst active-site type (which was already reported earlier), this figure directly reflects the effects of catalyst active-site distribution and the variance in the design of the supported MAO anion on the corresponding copolymer discrete LTD. Also, recall FIGS. 3-7B in this context. However, we note that, interestingly, the widths of these distributions and the following weight-average lamellar thicknesses, $L_{wav\ DSC-GT}$ and $L_{WAV\ SSA}$, were found to be mutually comparable (see Table 2). These thermal properties were calculated using mathematical expressions available in the literature.

Finally, we discuss how catalyst 1 and catalyst 2 affect the melting point $T_{mp}$ and crystallinity $X_c$ of the synthesized polymers (see Table 2). One can note that the $T_{mp}$ value of homopolymer 1 (133.30° C.) equals that of homopolymer 2 (133.32° C.). However, the $X_c$ value of homopolymer 1 (79.60%) is greater than that of homopolymer 2 (68.98%). This shows that the experimental supported catalyst type affected only the $\chi_c$ values of the homopolymers, but not their $T_{mp}$ values. The variation in $X_c$ can be attributed to the variation in lamellar thickness distribution and its most probable or weight-average value (sec FIG. 9). The lamellar thickness distribution of homopolymer 2 is shifted well to the left of that of homopolymer 1. Also, the $L_{MP\ DSC-GT}$ and $L_{wav\ DSC-GT}$ values of homopolymer 2 are much less than those of homopolymer 1. Hence, it is concluded that the crystallizable length of PE sequences produced by catalyst 2 is much less than that of catalyst 1, which is eventually reflected in the crystallinity values. Next, the influence of catalyst 1 and catalyst 2 on $T_{mp}$ and $\chi_c$ of the corresponding copolymers is addressed.

The $T_{mp}$ value of copolymer 1 (118.07° C.) is close to that of copolymer 2 (121.62° C.), which aligns with what was stated earlier for the homopolymers. However, the $X_c$ value of copolymer 1 (43.69%) is less than that of copolymer 2 (52.94%). This finding can be correlated with the melting characteristics, such as $L_{MP\ DSC-GT}$ and $L_{wav\ DSC-GT}$. As the interchain compositional heterogeneity index (i.e., the Crystaf CCD width $\sigma_{crystaf}$) and the intrachain microstructural parameters, such as the average ethylene sequence length, represented by $\eta_{E-NMR,\ MPNMR-Flory}$ and $\eta_{E\ MPDSC-GT}$. The afore-mentioned melting parameter(s) and average ethylene sequence length of copolymer 1 are less than those of copolymer 2. However, the opposite trend holds for $\sigma_{crystaf}$. This explains the difference in crystallinity between copolymer 1 and copolymer 2, which results from the varying capabilities of catalyst 1 and catalyst 2 to insert 1-hexene into the growing copolymer backbone according to 1,2 and 2,1 insertion mechanisms. This is again affected by the supported zirconocene$^{+-MAO-}$ ion pairs having different electronic and steric effects and coordination environments.

In sum, metallocenes are a modern innovation in polyolefin catalysis research. Therefore, we synthesized two supported metallocene catalysts: Catalyst 1 (silica/MAO/(''BuCp)$_2$ZrCl$_2$) and Catalyst 2 (silica/''BuSnCl$_3$/MAO/(''BuCp)$_2$ZrCl$_2$). In Catalyst 1, (''BuCp)$_2$ZrCl$_2$ was supported on MAO-pretreated silica, whereas in Catalyst 2, the silica was functionalized using ''BuSnCl$_3$ (a group 14 Lewis acid) before the MAO pretreatment. We prepared, without separate feeding of MAO, two ethylene-1-hexene copolymers, Copolymer 1 and Copolymer 2, under the same polymerization conditions, using Catalyst 1 and Catalyst 2, respectively. There was no reactor fouling during polymerization. Both copolymers were free-flowing particles, showed good morphology (bulk density of ca. 0.30 g mL$^{-1}$) and replicated the particle size distribution of the corresponding supported catalyst. Each catalyst turned out to be kinetically very stable. All these factors establish the occurrence of heterogeneous catalysis.

The synthesized polymers were characterized using GPC, Crystaf, DSC (conventional and SSA), and $^{13}C$ NMR spectroscopy, and the results were applied, as appropriate, to model the catalyst active-center distribution, MWD, CCD, ethylene sequence (equilibrium crystal) length distribution, and lamellar thickness distribution (both continuous and discrete). Various model parameters were calculated using these model predictions. This combination of models with experiments effectively illustrated how and why the active-center distribution and variance in the design of the supported MAO anion, having different electronic and steric effects and coordination environments, influence the concerned copolymerization mechanism and polymer properties, including inter- and intrachain compositional heterogeneity and thermal behaviors. The results will contribute to developing future supported metallocene catalysts that will be useful for synthesizing new grades of ethylene-α-olefin linear low-density polyethylene (LLDPEs). The major conclusions are as follows:

Five active-center types were predicted in each catalyst, as corroborated by our SSA DSC experiments, as well as by EXAFS work published in the literature. An excellent match was noted between the experimental results and model predictions. Hence, metallocenes impregnated particularly on an MAO-pretreated support can be rightly envisioned to comprise an ensemble of isolated single sites that have varying coordination environments. This finding can be attributed to the presence of five different MAO cage structures, each having variable aluminoxane —(AlOMe)-repeat units.

Catalyst 1 and catalyst 2 synthesized copolymers having experimental reactivity product ratios, $<r_E r_H>$, of ~4 and ~7, respectively. These values match the first-order Markovian statistical model predictions. Hence, terminal model copolymerization occurred in each case. The theoretical ethylene sequence distribution of copolymer 1 significantly differed from that of copolymer 2. However, the corresponding random parameter $\chi_R$ equaled 0.91. Accordingly, both copolymers were rated as fairly random with minor skewedness toward blocky character. The SSA DSC experiments also support this conclusion. The $<r_E r_H>$ values, being significantly different from unity, also indicate the existence of multiple active sites in each catalyst. This result complements the deconvolution model predictions and SSA DSC experimental results that we reported earlier.

The average ethylene sequence length $n_{E\text{-}NMR}$, theoretical most probable ethylene sequence $\eta_{E\ MPDSC\text{-}GT}$ and $\eta_{E\ MPNMR\text{-}Flory}$, cluster index, and most probable lamellar thickness $L_{MPDSC\text{-}GT}$ of copolymer 1 were less than those of copolymer 2. These results align with the corresponding copolymer reactivity ratios $r_E$ and $r_H$ and explain why the percentage crystallinity varied accordingly. Therefore, these particular microstructural parameters can be grouped to evaluate the intrinsic crystallizability of ethylene-1-hexene copolymer backbones.

For each copolymer, both $\eta_{E\ MPDSC\text{-}GT}$ and $\eta_{E\ MPNMR\text{-}Flory}$ and the weight-average lamellar thicknesses $L_{wav\ DSC\text{-}GT}$ and $L_{wav\ SSA\ DSC}$ were found to be mutually comparable. To the best of our knowledge, such a match has not previously been reported.

The percentage crystallinity of the homo- and copolymers increased linearly as a function of $L_{MPDSC\text{-}GT}$. This linear relation indicates that the homopolymer and copolymer chains folded in a similar fashion. This means that the butyl branch (that results from the incorporation of 1-hexene) was excluded from chain folding.

Our work coherently addressed heterogeneous metallocene catalysis (applied to ethylene homo- and copolymerization), the modeling of catalyst active-center types, copolymer compositional heterogeneity, the copolymerization mechanism, and the resulting copolymer thermal behaviors, which, to the best of our knowledge, have not previously been reported. Such a treatment of this subject will assist in the design and synthesis of future supported metallocene catalysts, capable of better regulating the copolymer backbone compositional variations and the resulting polymer thermal behaviors.

It is to be understood that the present invention is not limited to the embodiments described above, but encompasses any and all embodiments within the scope of the following claims.

We claim:

1. A supported metallocene catalyst for olefin polymerization, comprising:
    a dehydroxylated silica support having methylaluminoxane(MAO) disposed thereon, wherein said dehydroxylated silica support has an average pore volume of 3.00 cm$^3$g$^{-1}$ and a pore size of about 374 Å; and
    ("BuCp)$_2$ZrCl$_2$ impregnated on the silica/MAO support.

2. The supported metallocene catalyst according to claim 1, wherein the catalyst has an activity for ethylene homopolymerization of about 20.0 kilograms polyethylene per gram of catalyst per hour ×10$^2$.

3. The supported metallocene catalyst according to claim 1, wherein the catalyst has an activity for copolymerization of about 52.5 kilograms polyethylene per gram of catalyst per hour ×10$^2$.

4. The supported metallocene catalyst according to claim 1, wherein the catalyst comprises a free-flowing powder having a volume weighted mean particle size between 40 and 60 microns.

5. A method of making a supported metallocene catalyst for olefin polymerization, comprising the steps of:
    dehydroxylating silica;
    forming a slurry of the dehydroxylated silica in toluene;
    adding methylaluminoxane (MAO) dropwise to the slurry of the dehydroxylated silica in toluene to form a mixture;
    heating the mixture to form an MAO/silica support, wherein said support has an average pore volume of 3.00 cm3g–1 and a pore size of about 374 Å;
    reacting ("BuCp)$_2$ZrCl$_2$ in toluene solvent with the MAO/silica support to form the catalyst; and
    drying the catalyst under vacuum.

6. The method of making a supported metallocene catalyst according to claim 5, wherein said step of dehydroxylating silica comprises dehydroxylating silica at 250° C. for at least four hours.

7. The method of making a supported metallocene catalyst according to claim 5, wherein said step of heating the mixture to form an MAO/silica support comprises heating the mixture between 0.5 and 5 hours.

8. A supported metallocene catalyst for olefin polymerization, comprising a catalyst made by performing the method of making a supported metallocene catalyst according to claim 5.

9. A method of copolymerizing ethylene with an alpha-olefin, comprising the steps of:
    adding the alpha-olefin to a reactor containing a non-polar organic solvent;
    forming a slurry of a catalyst in an organic solvent, the catalyst being ("BuCp)$_2$ZrCl$_2$ impregnated onto a silica support having MAO tethered thereon, wherein said support has an average pore volume of 3.00 cm3g–1 and a pore size of about 374 Å;
    adding the slurry to the reactor;
    feeding ethylene into the reactor at 5 bar of pressure to form a mixture;
    polymerizing the mixture in the reactor at 50° C.;
    stopping ethylene feed into the reactor and venting unreacted ethylene from the reactor to quench polymerization; and
    recovering a copolymer of ethylene and the alpha-olefin from the reactor.

10. The method of copolymerizing ethylene according to claim 9, wherein said non-polar organic solvent comprises n-hexane.

11. The method of copolymerizing ethylene according to claim 9, wherein said alpha-olefin comprises 1-hexene.

12. The method of copolymerizing ethylene according to claim 9, wherein said step of polymerizing the mixture comprises polymerizing the mixture for at least one hour.

13. The method of copolymerizing ethylene according to claim 9, wherein said step of recovering the copolymer comprises cooling the mixture to room temperature and drying the mixture overnight at ambient temperature and pressure.

14. The method of copolymerizing ethylene according to claim 9, wherein said step of polymerizing the mixture further comprises stirring the mixture during polymerization.

15. The method of copolymerizing ethylene according to claim 9, further comprising the step of scavenging impurities from the non-polar organic solvent with triisobutyl aluminum prior to said step of adding the alpha-olefin to the reactor.

16. The method of copolymerizing ethylene according to claim 9, further comprising the step of passing the ethylene through oxygen- and moisture-removing columns prior to said step of feeding ethylene into the reactor.

* * * * *